United States Patent [19]
Lander

[11] Patent Number: 5,955,853
[45] Date of Patent: Sep. 21, 1999

[54] DIRECT CURRENT MOTOR FOR CLOSED-LOOP FEEDBACK CONTROL

[75] Inventor: Daniel Lander, Brush Prairie, Wash.

[73] Assignee: Hewlett-Packard Company, Palo Alto, Calif.

[21] Appl. No.: 08/950,164

[22] Filed: Oct. 14, 1997

Related U.S. Application Data

[63] Continuation-in-part of application No. 08/791,735, Jan. 31, 1997, Pat. No. 5,869,939.

[51] Int. Cl.[6] ........................................... H02P 1/00
[52] U.S. Cl. ........................... 318/439; 318/138; 318/734; 318/735
[58] Field of Search ................................... 318/138, 139, 318/245, 254, 439, 734, 735, 638, 799, 607; 310/51, 67 R, 245, 186, 65, 216, 195, 180

[56] References Cited

U.S. PATENT DOCUMENTS

| | | | |
|---|---|---|---|
| 4,078,194 | 3/1978 | Johnson, Jr. .............................. | 318/331 |
| 4,341,971 | 7/1982 | Tahara et al. ........................... | 310/195 |
| 4,594,536 | 6/1986 | Tamagaki ................................ | 318/561 |
| 4,687,961 | 8/1987 | Horber .................................... | 310/186 |
| 4,883,999 | 11/1989 | Hendershot ............................. | 310/254 |
| 5,045,742 | 9/1991 | Armstrong et al. ..................... | 310/254 |
| 5,089,730 | 2/1992 | O'Connor et al. ........................ | 310/51 |
| 5,128,577 | 7/1992 | Kobayashi .............................. | 310/233 |
| 5,196,775 | 3/1993 | Harris et al. ............................ | 318/638 |
| 5,250,867 | 10/1993 | Gizaw .................................... | 310/179 |
| 5,428,276 | 6/1995 | Carobolante et al. ................... | 318/254 |
| 5,432,421 | 7/1995 | Kessler et al. .......................... | 318/538 |
| 5,442,272 | 8/1995 | Schwartz ................................. | 318/778 |
| 5,703,456 | 12/1997 | Cox ......................................... | 318/701 |

FOREIGN PATENT DOCUMENTS

3935594A1  5/1991  Germany .

OTHER PUBLICATIONS

Eurpoean Search Report Dated Feb. 24, 1999. for related EPO Application No. 98300335. 1–2207.

*Primary Examiner*—Paul Ip
*Attorney, Agent, or Firm*—Erik A. Anderson

[57] ABSTRACT

A direct current motor for use in a closed-loop control system is disclosed that produces a time varying signal indicative of a position of the motor. An embodiment of the motor includes a rotating commutator having a plurality of slots, a plurality of windings, the number of windings corresponding to one more than the number of slots of the commutator, and a plurality of brushes that are configured so that application of a direct current voltage across the brushes causes the commutator to rotate.

A closed-loop control system is also disclosed that includes a direct current voltage source, a direct current motor in accordance with the present, a motor position signal source that generates a motor position signal for rotating the shaft of the direct current motor to a desired position, and a feedback circuit that corrects for any error in the desired position of the shaft of the direct current motor.

Further disclosed are methods of controlling a position of a direct current motor constructed in accordance with the present invention in a closed-loop feedback control system.

19 Claims, 19 Drawing Sheets

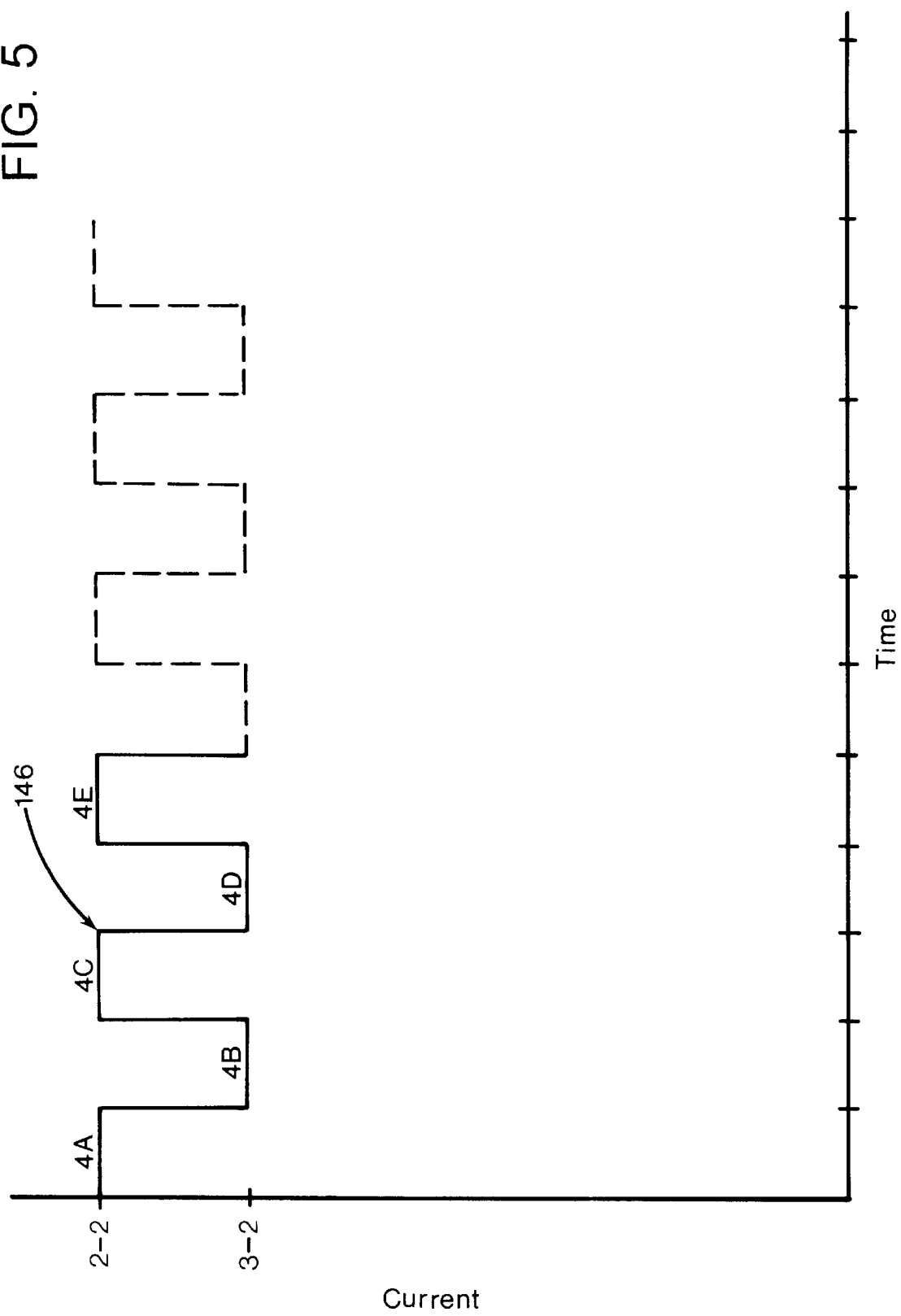

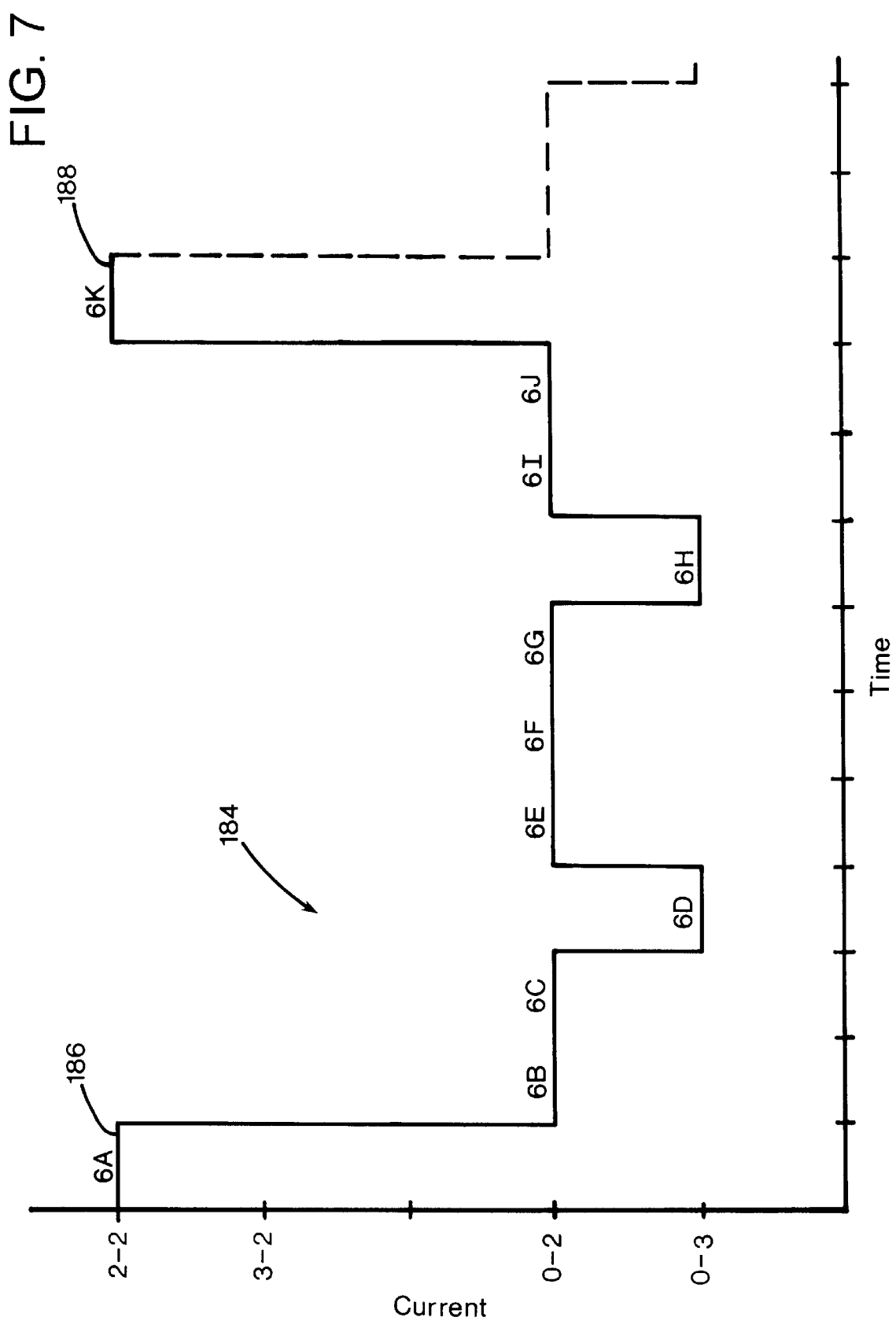

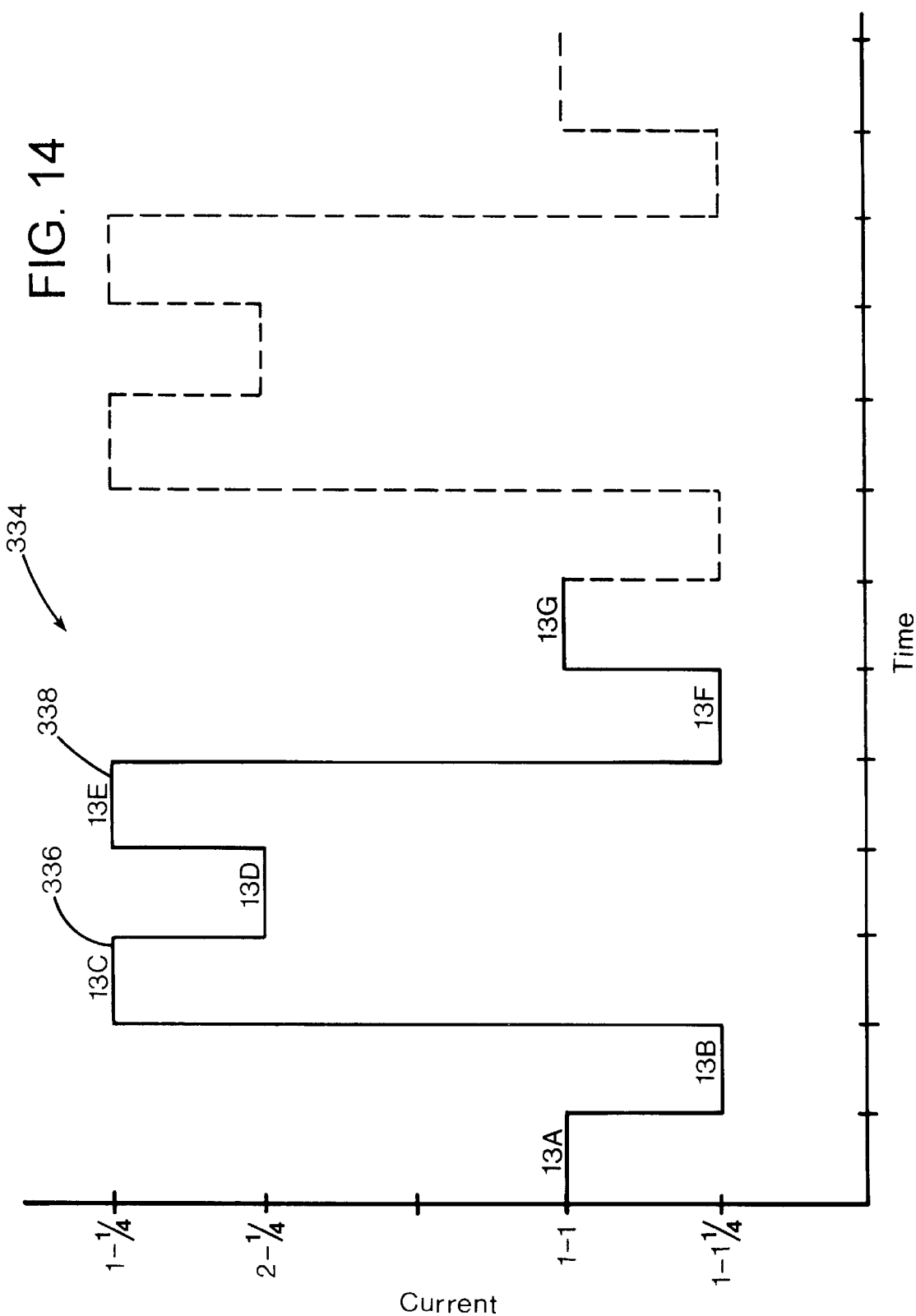

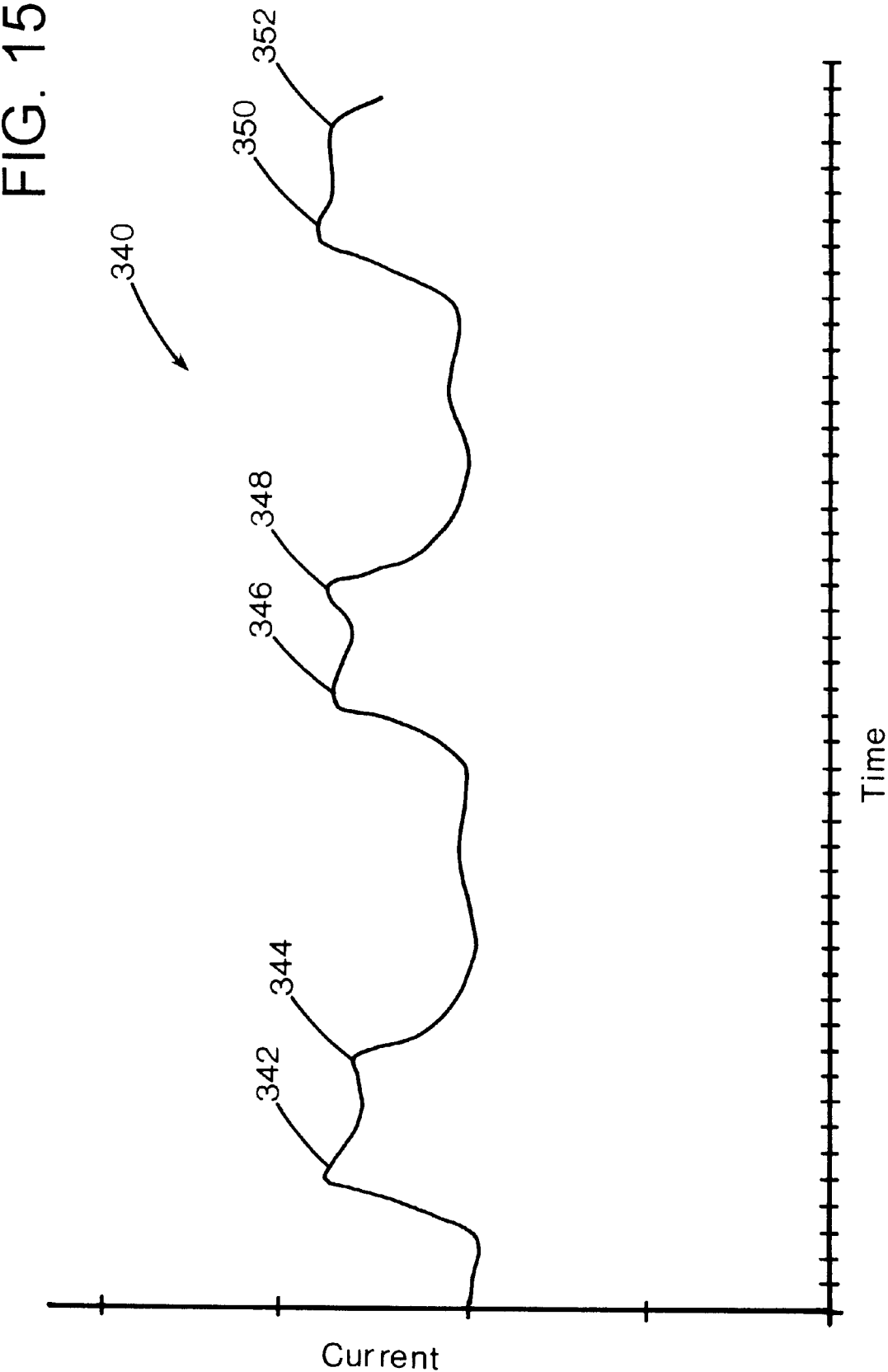

DIRECT CURRENT MOTOR FOR CLOSED-LOOP FEEDBACK CONTROL

RELATED APPLICATIONS

This is a continuation-in-part patent application of U.S. patent application Ser. No. 08/791,735, filed on Jan. 31, 1997, now U.S. Pat. No. 5,869,939.

BACKGROUND OF THE INVENTION

The present invention relates generally to motors, and more particularly to a direct current (dc) motor that generates a time-varying signal for closed-loop feedback control.

Motor control systems may be used in a variety of applications including those such as computers, printing mechanisms, video cassette recorders (VCRs), automobiles, and stereos. These applications include VCR head motors, spindle motors for computer flexible disks, spindle motors for compact disks, tape drive capstans for tape drives, and automobile seat positioning motors. Motor control systems may be used in printing mechanisms for such things as moving the print carriage, moving the print media, and moving elements of the inkjet printhead service station.

Both stepper motors and direct current (dc) motors may be used in such motor control systems. Stepper motors are typically used in an open-loop configuration in which the stepper motor receives a command signal which causes a shaft of the stepper motor to rotate in a predetermined direction for a predetermined number of degrees. The command signal may be in the form of one or more pulses from a microprocessor which is programmed to generate the one or more pulses to rotate the shaft of the stepper motor in the predetermined direction for the predetermined number of degrees to perform a specified function (e.g., actuating a service station to cap an inkjet printhead). The polarity and/or phasing of multiple signals may be used to control the direction of stepper motor shaft rotation. The open-loop system is also capable of tracking the position of the stepper motor shaft by, for example, noting the initial shaft position and counting the number of pulses already transmitted. The open-loop stepper motor control system provides accurate motor control and positioning of controlled devices.

DC motors may be used in either an open-loop or a closed-loop configuration. In an open-loop configuration, a shaft of a dc motor rotates as long as a dc voltage control signal is applied and for a period after the signal is removed until the inertia of the rotating shaft is dampened. The direction of rotation of the shaft of the dc motor is controlled by the polarity of the control signal. Accurate motor control and positioning of controlled devices is difficult with such open-loop dc motor control systems because the shaft does not rotate a predetermined amount each time a control signal is applied, as with stepper motors. An advantage, however, to control systems that utilize dc motors is that a dc motor based control system utilizes power more efficiently, and is thus less expensive to operate, than an open-loop stepper motor because power isn't disrupted to turn the dc motor shaft as in a stepper motor. DC motors are also currently less expensive than stepper motors.

Various solutions have been offered to deal with this positioning problem, including the use of stops and the use of a closed-loop dc motor control system. Stops are fixed structures that are placed in the path of a controlled device that prevent further movement of the device in a particular direction. Closed-loop dc motor control systems utilize a feedback device, such as an encoder, a switch, or tachometer, to track the actual position of a shaft of the direct current motor or of the controlled device. The actual position is fed back and compared with the desired position. Any difference between the two is corrected by sending a further signal to the motor to rotate the shaft until it properly positions the controlled device. This design provides accurate motor control and positioning of controlled devices, comparing favorably with open-loop stepper motor control systems. A drawback to such closed-loop systems is that these feedback devices are expensive. This added expense may result in the cost of this closed-loop dc motor control system approaching or exceeding that of an open-loop stepper motor control system.

SUMMARY OF THE INVENTION

The present invention is directed to achieving accurate motor control and positioning of controlled devices through the use of a direct current (dc) motor, while at the same time avoiding the use of expensive feedback control devices to correct for initial inaccuracies in dc motor control. The present invention accomplishes this by varying armature resistance of a dc motor as the motor rotates so, at a constant dc voltage, the dc motor current repeatably varies or, at a constant dc current, the dc motor voltage repeatably varies. This variation is fed back and used to determine the actual position of the shaft of the motor. Any inaccuracies in the position of the shaft and thus the controlled device may then be corrected.

Thus, at least one advantage of the present invention is that it includes a motor position feedback generating device built directly into the motor so that the additional cost of traditional feedback generating devices, such as encoders, switches, and tachometers, are eliminated. Another advantage of the present invention is that of improved control system reliability because failure of a separate feedback generating device has been eliminated from the control system as a factor in overall system performance. A further advantage of the present invention is enhanced manufacturability by virtue of the fact that a separate feedback generating device does not need to be installed as a component of each control system.

An aspect of the present invention is a direct current motor for use in a closed-loop control system. The direct current motor includes a commutator that has a plurality of slots and is configured to rotate. The direct current motor also includes a plurality of windings, the number of windings corresponding to one more than the number of slots of the commutator. The direct current motor additionally includes a plurality of brushes that are configured so that application of a direct current voltage across the brushes results in a current flow in at least one of the windings which causes the commutator to rotate. Continuous application of the direct current voltage across the brushes causes the current to flow in a varying number of the windings as the commutator continues to rotate.

The above-described direct current motor may be modified and include the following characteristics, as described below. Two of the windings may be electrically in parallel. The current flowing in the windings may vary with time and have a maximum magnitude indicative of a position of the motor.

The direct current motor may include a shaft coupled to the commutator so that rotation of the commutator results in rotation of the shaft. In this embodiment, the current flowing in the windings varies with time in a manner indicative of a position of the shaft. The current flowing in the windings may have a maximum magnitude every one hundred and eighty degrees (180°) of rotation of the shaft.

Another aspect of the present invention relates to a closed-loop control system. The system includes a direct current motor having a shaft and being configured so that application of the direct current voltage to the motor causes the shaft to rotate and produces a current that varies with time as the shaft rotates. This time varying current has a maximum magnitude indicative of a position of the shaft of the motor. The system also includes a motor position signal source that generates a motor commanded position signal for rotating the shaft of the direct current motor to a desired position. The system additionally includes a feedback circuit configured to generate an actual position signal representative of the actual position of the shaft of the direct current motor. The actual position signal is derived from the time varying magnitude of the current. The feedback circuit is further configured to generate a motor position error signal representative of any difference between the motor commanded position signal from the motor position signal source and the actual position signal. The system further includes a direct current voltage source that is coupled to the direct current motor. The motor position error signal is coupled to the direct current voltage source to rotate the shaft of the direct current motor based on the motor position error signal to correct for any error in the desired position of the shaft of the direct current motor.

The above-described closed-loop control system may be modified and include the following characteristics, as described below. The motor position signal source may include a microprocessor or a controller. The feedback circuit may include an Application Specific Integrated Circuit (ASIC) that is designed to generate the actual position signal based on the time varying magnitude of the current. The feedback circuit may further include a comparator configured to generate the motor position error signal representative of any difference between the motor commanded position signal from the motor position signal source and the actual position signal.

The closed-loop control system may be used in a printing mechanism. The direct current motor may include a commutator having a plurality of slots and being configured to rotate. The direct current motor also includes a plurality of windings. The number of windings that conduct current corresponds to one more than the number of slots of the commutator. Two of the windings may be electrically in parallel.

An alternative embodiment of a closed-loop control system in accordance with the present invention includes a direct current motor having a shaft and being configured so that application of a constant current to the motor causes the shaft to rotate and produces a voltage drop across the dc motor that varies with time as the shaft rotates. This time varying voltage has a maximum magnitude indicative of a position of the shaft of the motor. The system also includes a motor commanded position signal source that generates a motor position signal for rotating the shaft of the direct current motor to a desired position. The system additionally includes a feedback circuit configured to generate an actual position signal representative of the actual position of the shaft of the direct current motor. The actual position signal is derived from the time varying magnitude of the voltage. The feedback circuit is further configured to generate a motor position error signal representative of any difference between the motor commanded position signal from the motor position signal source and the actual position signal. The system further includes a constant current source that is coupled to the direct current motor. The motor position error signal is coupled to the constant current source to rotate the shaft of the direct current motor based on the motor position error signal to correct for any error in the desired position of the shaft of the direct current motor.

This alternative closed-loop control system may be modified and include the characteristics described above in connection with the first closed-loop control system. This alternative closed-loop control system may also be used in a printing mechanism.

A further aspect of the present invention relates to a method of controlling a position of a direct current motor in a closed-loop feedback control system. The method includes the steps of generating a motor commanded position signal for rotating the shaft of the direct current motor to a desired position and generating an actual position signal representative of the actual position of the shaft of the direct current motor. The actual position signal is derived from a time varying magnitude of a current of the direct current motor. The method additionally includes the steps of generating a motor position error signal representative of any difference between the motor commanded position signal and the actual position signal and generating a direct current voltage based on the motor position error signal to rotate the shaft of the direct current motor to the desired position.

A still further aspect of the present invention relates to a method of controlling a shaft of a direct current motor in a closed-loop feedback control system. The method includes the steps of generating a motor commanded position signal for rotating the shaft of the direct current motor to a desired position and generating an actual position signal representative of the actual position of the shaft of the direct current motor. The actual position signal is derived from a time varying magnitude of a voltage of the direct current motor. The method additionally includes the steps of generating a motor position error signal representative of any difference between the motor commanded position signal and the actual position signal and generating a constant current based on the motor position error signal to rotate the shaft of the direct current motor to the desired position.

Other objects, advantages, and novel features of the present invention will become apparent from the following detailed description of the invention when considered in conjunction with the accompanying drawings.

BRIEF DESCRIPTION OF THE DRAWINGS

FIG. 5 is a graph of current versus time for the direct current (dc) motor operation shown in FIGS. 4A–4E.

FIG. 7 is a graph of current versus time for the direct current (dc) motor operation of the present invention shown in FIGS. 6A–6K.

FIG. 14 is a graph of current versus time for the direct current (dc) motor of the present invention shown in FIGS. 13A–13G.

FIG. 15 is a plot of an actual current versus time output for a direct current (dc) motor constructed in accordance with the present invention.

DETAILED DESCRIPTION OF THE DRAWINGS

Figure 1:
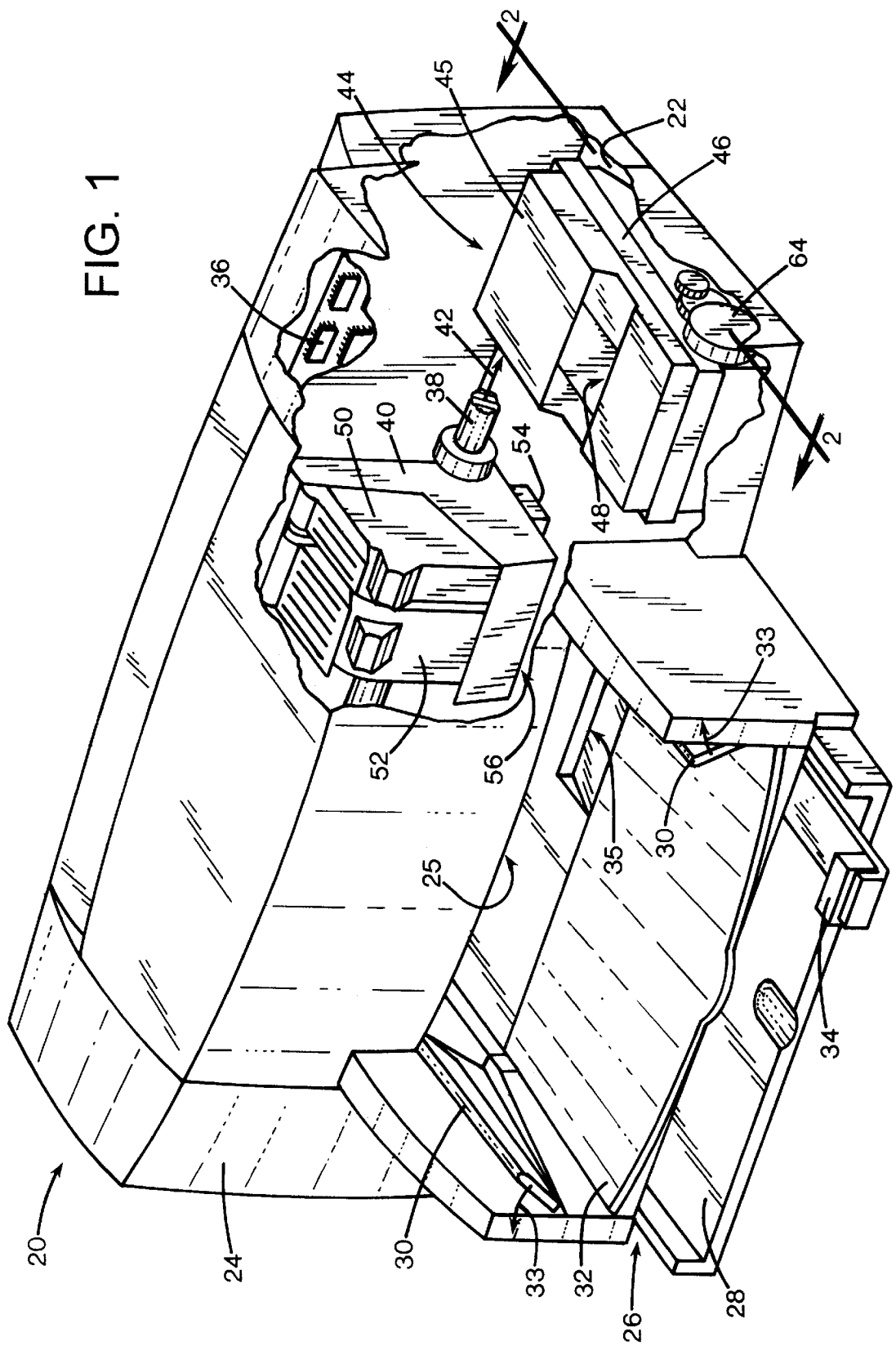
FIG. 1 is a fragmented, partially schematic, perspective view of an inkjet printing mechanism including a servicing station translationally moveable via a stepper motor control system.

FIG. 1 illustrates an embodiment of an inkjet printing mechanism, here shown as an inkjet printer 20, which may be used for printing for business reports, correspondence, desktop publishing, and the like, in an industrial, office, home or other environment. A variety of inkjet printing mechanisms are commercially available. For instance, some of the printing mechanisms that may embody the present invention, described below, include plotters, portable printing units, copiers, cameras, video printers, and facsimile machines, to name a few. The present invention may be used in printing mechanisms for such things as moving the print carriage, moving the print media, and moving elements of the inkjet printhead service station. The present invention may also find application outside of printing mechanisms. For example, applications of the present invention may include VCRs, computers, automobiles, and stereos. For convenience, the concepts of the present invention are illustrated in the environment of an inkjet printer 20. It is to be understood, however, that the present invention may be used in other microprocessor or controller based direct current (dc) motor applications as well, such as those described above.

While it is apparent that the printer components may vary from model to model, the typical inkjet printer 20 includes a chassis 22 surrounded by a housing or casing enclosure 24, typically of a plastic material. Sheets of print media are fed through a print zone 25 by an adaptive print media handling system 26. The print media may be any type of suitable sheet material, such as paper, card-stock, transparencies, mylar, and the like, but, for convenience, the illustrated embodiment is described using paper as the print medium. The print media handling system 26 has a feed tray 28 for storing sheets of paper before printing. A series of conventional motor-driven paper drive rollers (not shown) may be used to move the print media from tray 28 into the print zone 25 for printing. After printing, the sheet then lands on a pair of retractable output drying wing members 30. The wings 30 momentarily hold the newly printed sheet above any previously printed sheets still drying in an output tray portion 32 before pivotally retracting to the sides, as shown by curved arrows 33, to drop the newly printed sheet into the output tray 32. The media handling system 26 may include a series of adjustment mechanisms for accommodating different sizes of print media, including letter, legal, A-4, envelopes, etc., such as a sliding length adjustment lever 34, and an envelope feed slot 35.

Printer 20 also has a printer controller, illustrated schematically as a microprocessor 36, that receives instructions from a host device, typically a computer, such as a personal computer (not shown). Indeed, many of the printer controller functions may be performed by the host computer, by the electronics on board the printer, or by interactions therebetween. A monitor coupled to the computer host may be used to display visual information to an operator, such as the printer status or a particular program being run on the host computer. Personal computers, their input devices, such as a keyboard and/or a mouse device, and monitors are all well known to those skilled in the art.

A carriage guide rod 38 is supported by the chassis 22 to slideably support an inkjet carriage 40 for travel back and forth across the print zone 25 along a scanning axis 42 defined by the guide rod 38. A conventional carriage propulsion system may be used to drive carriage 40, including a position feedback system, which communicates carriage position signals to the controller 36. For instance, a carriage drive gear and DC motor assembly may be coupled to drive an endless belt secured in a conventional manner to carriage 40, with the motor operating in response to control signals received from the printer controller 36. To provide carriage positional feedback information to printer controller 36, an optical encoder reader may be mounted to carriage 40 to read an encoder strip extending along the path of carriage travel.

The carriage 40 is also propelled along guide rod 38 into a servicing region, as indicated generally by arrow 44, located within the interior of the casing 24. The servicing region 44 houses a service station 45, which may provide various conventional printhead servicing functions. For example, a service station frame 46 holds a group of printhead servicing appliances, described in greater detail below. In FIG. 1, a spittoon portion 48 of the service station is shown as being defined, at least in part, by the service station frame 46.

In the print zone 25, the media sheet receives ink from an inkjet cartridge, such as a black ink cartridge 50 and/or a color ink cartridge 52. The cartridges 50 and 52 are also often called "pens" by those in the art. The illustrated color pen 52 is a tri-color pen, although in some embodiments, a set of discrete monochrome pens may be used.

The illustrated pens 50, 52 each include reservoirs for storing a supply of ink. The pens 50, 52 have printheads 54, 56, respectively, each of which has an orifice plate with a plurality of nozzles formed therethrough in a manner well known to those skilled in the art. The illustrated printheads 54, 56 are thermal inkjet printheads, although other types of printheads may be used, such as piezoelectric printheads. The printheads 54, 56 typically include a substrate layer having a plurality of resistors which are associated with the nozzles. Upon energizing a selected resistor, a bubble of gas is formed to eject a droplet of ink from the nozzle and onto media in the print zone 25. The printhead resistors are selectively energized in response to enabling or firing command control signals, which may be delivered by a conventional multi-conductor strip (not shown) from the controller 36 to the printhead carriage 40, and through conventional interconnects between the carriage and pens 50, 52 to the printheads 54, 56.

Figure 2:
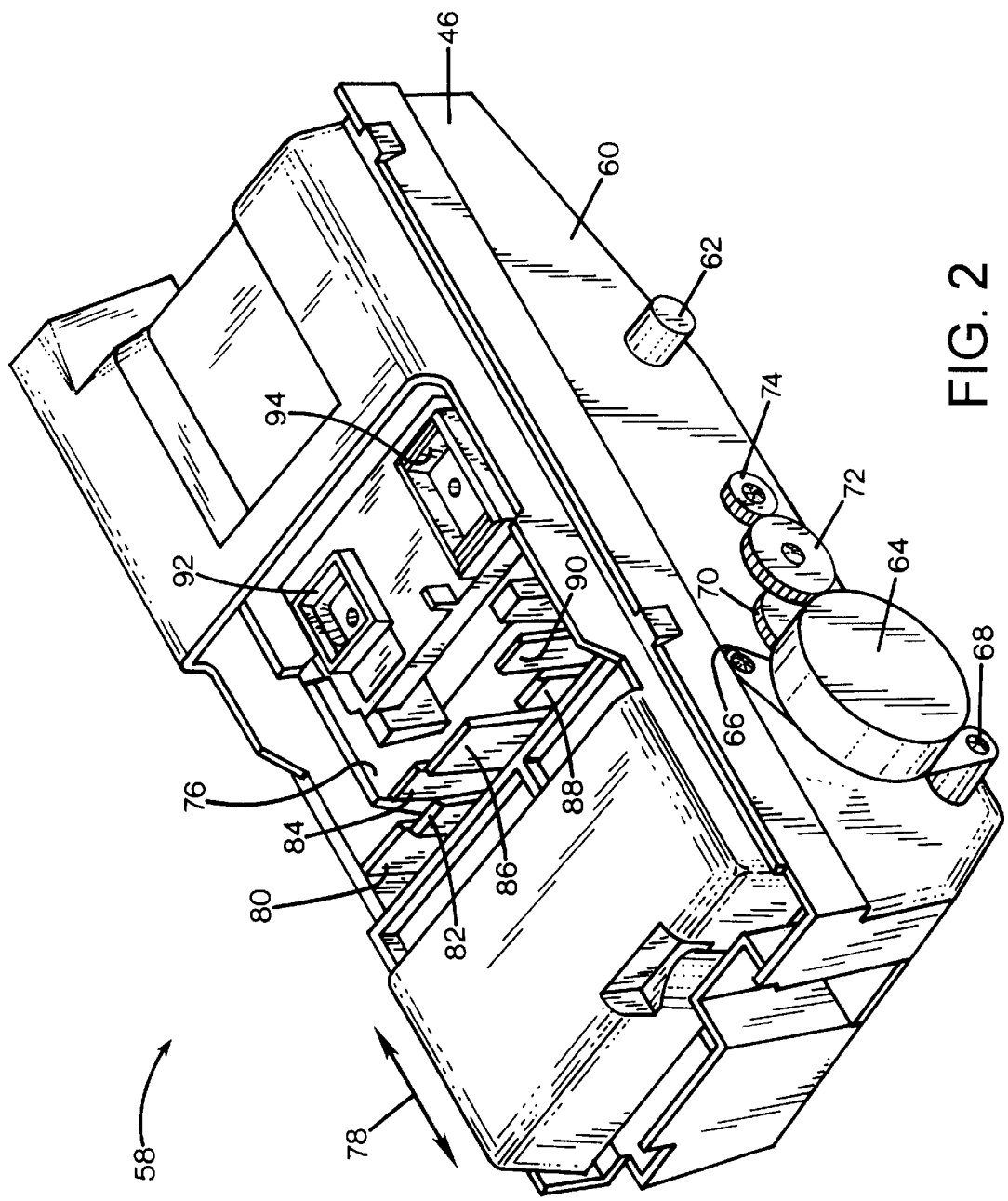
FIG. 2 is a fragmented, perspective view of one form of a service station of FIG. 1.

FIG. 2 illustrates an embodiment of a transitional service station system 58. Here, the service station frame 46 includes a base member 60 which may be attached to the printer chassis 22, for instance using a snap fastener, a rivet, a screw or other fastening device inserted through a slotted hole (not shown) defined by a front portion of the base 60. To adjust the elevation of the printhead servicing components, an adjustment mechanism (not shown) may be used to engage the frame, for instance by using a pair of posts 62 extending outwardly from each side of the frame base 60.

Chassis 22, or more preferably the exterior of the base 60, may be used to support a conventional service station drive motor, such as a stepper motor 64. Preferably, stepper motor 64 has upper and lower mounting points, with the upper mount being secured to frame base 60 by, for example, a fastener 66 that extends into base 60. Base 60 may also have a boss, or other fastener receiving structure, here extending outwardly from the side to receive a fastener 68, that secures the lower motor mount to base 60. Stepper motor 64 is operatively engaged to drive a first transfer gear 70, using one or more reduction gears, belts, or other drive means known to those skilled in the art, here shown driving a second transfer gear 72. Both the first and second transfer gears 70, 72 are preferably mounted to posts extending from the side of the base 60. Transfer gear 72 engages one of a pair of drive gears 74 of a spindle pinion drive gear assembly (not shown). The pair of drive gears 74 reside along opposite sides of the service station frame and are coupled together by an axle (not shown). Stepper motor 64 and these gears operate to translationally move pallet 76 in the directions indicated by the double-headed arrow 78.

Pallet 76 is translated in the directions indicated by double-headed arrow 78 to periodically service printheads 54 and 56 of pens 50 and 52. This servicing includes such things as wiping away excess ink from printheads 54 and 56 via flexible service station wipers 80, 82, 84, 86, 88 and 90, and capping printheads 54 and 56 via caps 92 and 94 to help prevent pens 50 and 52 from drying out and being dirtied by contaminants.

Stepper motors, like stepper motor 64, are typically used in an open-loop configuration in which the stepper motor receives a command signal, from, for example a microprocessor or controller, such as controller 36, which causes a shaft of the stepper motor to rotate in a predetermined direction for a predetermined number of degrees. The command signal may be in the form of one or more pulses from a microprocessor or controller which is programmed to generate the one or more pulses to rotate the shaft of the stepper motor in the predetermined direction for the predetermined number of degrees to perform a specified function (e.g., actuating a service station to cap an inkjet printhead). The polarity and/or phasing of multiple signals may be used to control the direction of stepper motor shaft rotation. The open-loop system is also capable of tracking the position of the stepper motor shaft by, for example, noting the initial shaft position and counting the number of pulses already transmitted. The open-loop stepper motor control system provides accurate motor control and positioning of controlled devices.

Figure 3:
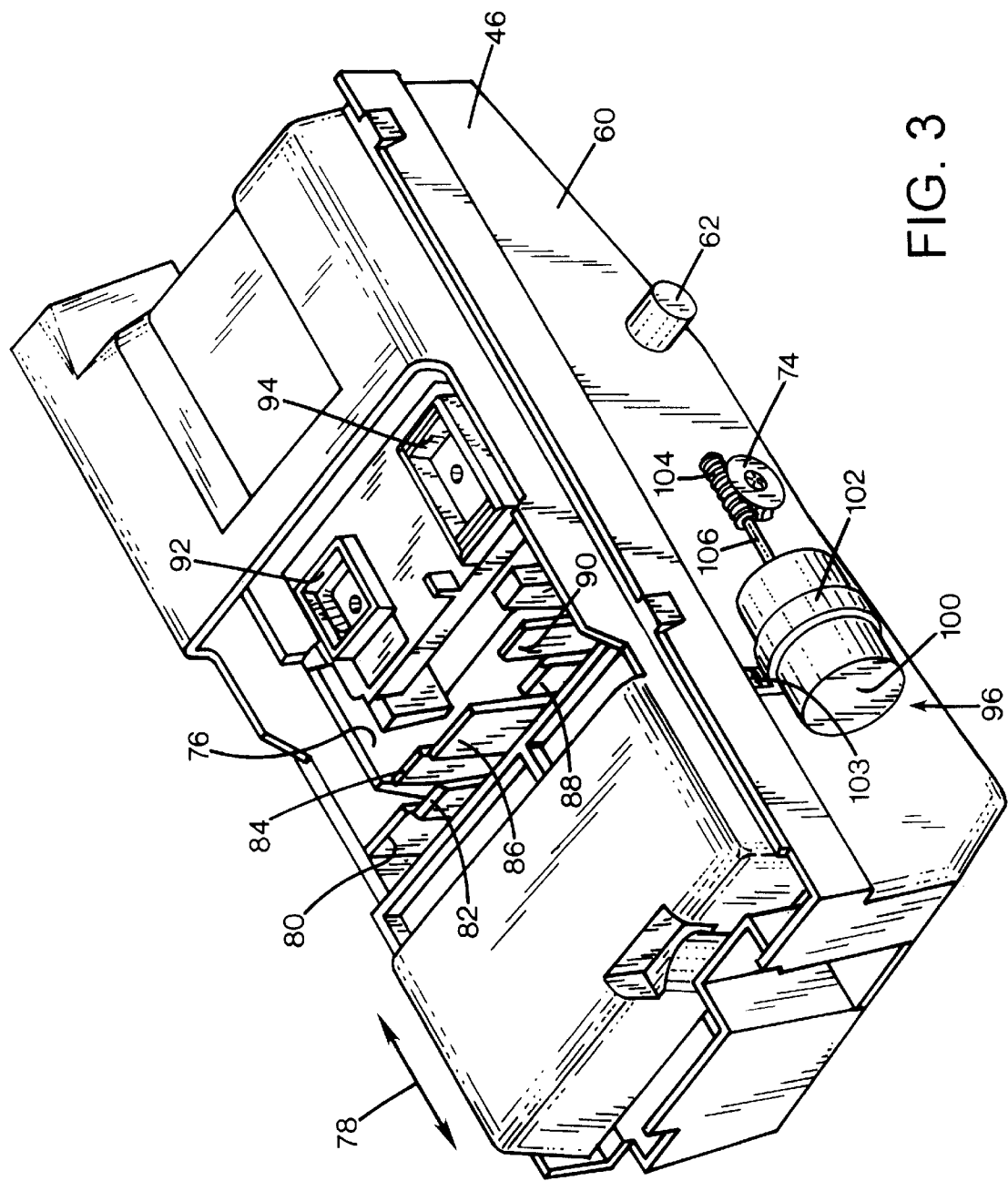
FIG. 3 is a fragmented, perspective view of the service station of FIG. 2 controlled by a closed-loop direct current (dc) motor control system of the present invention.

A transitional service station system 96 in accordance with the present invention is shown in FIG. 3. Elements of system 96 that are the same as those of system 58 are identified with the same reference numerals. System 96 is actuated via a direct current (dc) motor 100 constructed in accordance with the present invention, rather than via a stepper motor, like motor 64 in FIG. 2. A clamp 102 and a pair of fasteners, one of which is shown by reference numeral 103, attaches motor 100 to base 60. A worm gear 104 driven by shaft 106 of motor 102 meshes with gear 74 to translate pallet 76 in the directions indicated by the double-headed arrow 78. Motor 100 is powered by a dc voltage to continuously rotate shaft 106 in either a clockwise or counterclockwise direction as long as this voltage is applied. The direction of such rotation is controlled by the polarity of the applied dc voltage.

Figure 4A:
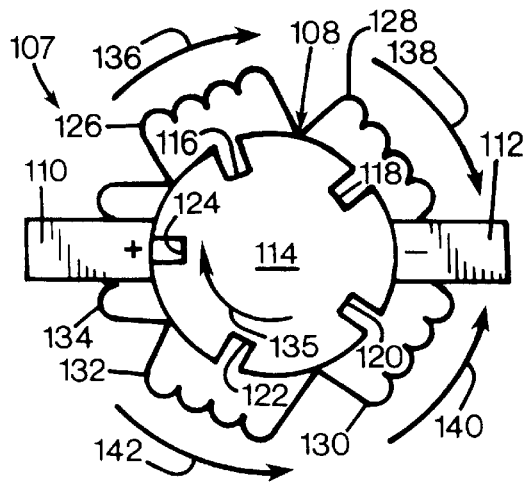
FIGS. 4A–4E are partial schematic views of the operation of a direct current (dc) motor.
Figure 4B:
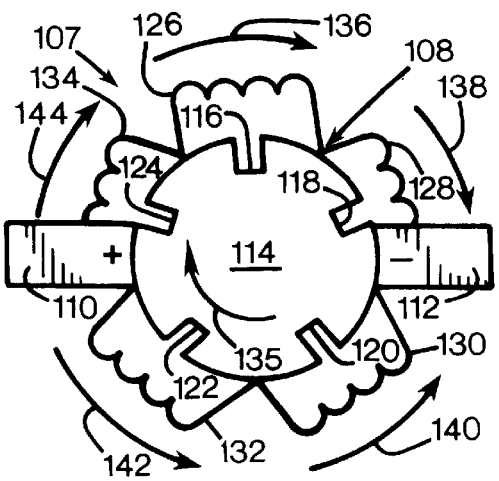
Figure 4C:
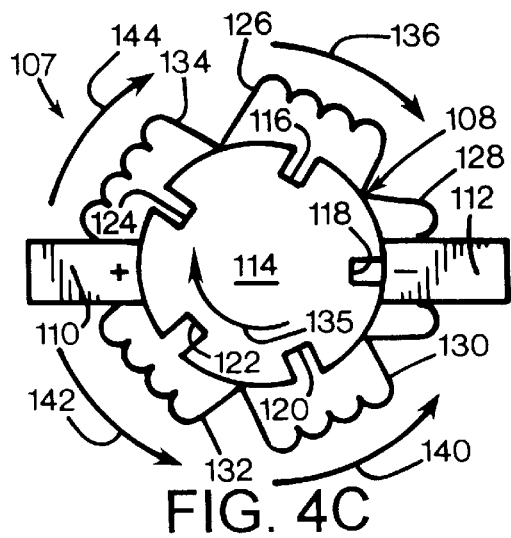
Figure 4D:
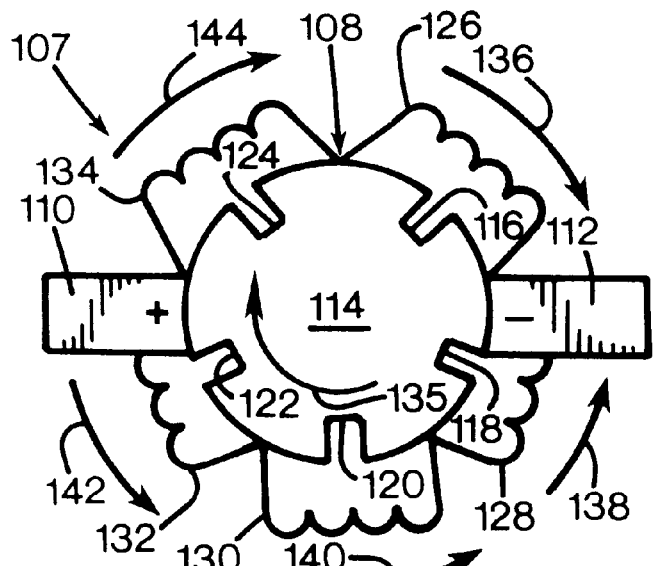
Figure 4E:
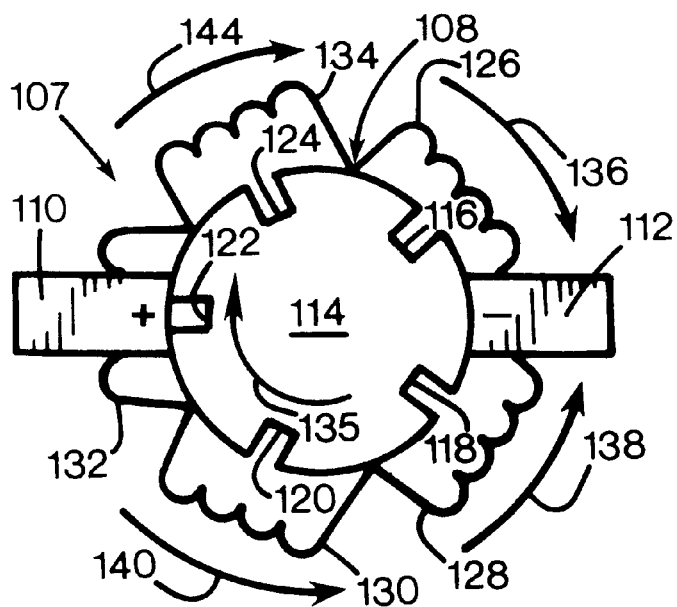

FIGS. 4A–4E are partial schematic views of the operation of a dc motor 107. DC motor 107 includes an armature 108 and a pair of brushes 110 and 112 across which a dc voltage is applied. Armature 108 is shown as including a commutator 114 having five slots 116, 118, 120, 122, and 124, and on which five windings 126, 128, 130, 132, and 134 are wound. If a fixed dc voltage or constant Root Mean Square (RMS) dc voltage is applied across brushes 110 and 112 as shown in FIGS. 4A–4E, a positive current will flow from brush 110 to brush 112 via some or all of windings 126, 128, 130, 132, and 134 which will cause commutator 114 to rotate in a clockwise direction, as generally indicated by arrow 135 in FIGS. 4A–4E. Referring to FIG. 4A, it can be seen that in this position of commutator 114, current will flow through windings 126 and 128, as generally indicated by current arrows 136 and 138, and through windings 130 and 132, as generally indicated by current arrows 140 and 142. Current does not flow, however, through winding 134 because of the short caused by slot 124 which is under brush 110. Referring to FIG. 4B, commutator 114 has rotated clockwise a sufficient amount to the position shown so that current is flowing in each winding of armature 108, including winding 134, as generally indicated by current arrow 144, because slot 124 is no longer under brush 110. Further rotation of commutator 114 in the clockwise direction is shown in FIG. 4C. At this point, winding 128 is shorted so that no current flows though it because slot 118 is located under brush 112. Current flows through the other windings of armature 108 as shown. Referring to FIG. 4D, commutator 114 has rotated clockwise further so that current flows through all five windings of armature 108 as shown, including winding 128, as indicated by current arrow 138, because slot 118 is no longer under brush 112. Further clockwise rotation of commutator 114 is captured in FIG. 4E. In this position, winding 132 is shorted because slot 122 is located under brush 110. Current flows through the other windings of armature 108 as shown.

FIG. 5 shows a graph 146 of current versus time for the dc motor operation shown in FIGS. 4A–4E. As can be seen in FIG. 5, the magnitude of the current periodically varies between two values during rotation of commutator 114. The larger magnitude is indicated with a "2-2" in FIG. 5 and the smaller magnitude is indicated with a "3-2" in FIG. 5. The "2-2" indicates the value of the total current flowing from brush 110 to brush 112 when current flows through two windings above brushes 110 and 112 and two windings below brushes 110 and 112 in FIGS. 4A, C, and E. The "3-2" indicates the value of the total current flowing from brush 110 to brush 112 when current flows through three windings above brushes 110 and 112 and two windings below brushes 110 and 112 in FIG. 4B, and three windings below brushes 110 and 112 and two windings above brushes 110 and 112 in FIG. 4D. The magnitude of the current is less in the "3-2" case than in the "2-2" case because the additional winding adds resistance which decreases current flow for an applied dc voltage. The "4A", "4B", "4C", "4D", and "4E" in FIG. 5 correspond with the positions shown in FIGS. 4A–4E. The dashed portion of graph 146 is representative of additional current flow from brush 110 to brush 112 versus time for the same applied fixed dc voltage or constant Root Mean Square (RMS) dc voltage.

Although dc motor 107 produces a repeatable current versus time output, this signal is not useful in detecting the position of the dc motor shaft at any given time which is needed in control systems where a dc motor is used. DC motors may be used in either an open-loop or a closed-loop configuration. In an open-loop configuration, a shaft of a dc motor rotates as long as a dc voltage control signal is applied and for a period after the signal is removed until the inertia of the rotating shaft is dampened. The direction of rotation of the shaft of the dc motor is controlled by the polarity of the control signal. Accurate motor control and positioning of controlled devices is difficult with such open-loop dc motor control systems because the shaft does not rotate a predetermined amount each time a control signal is applied. An advantage, however, to control systems that utilize dc motors is that a dc motor based control system utilizes power more efficiently, and is thus less expensive to operate, than an open-loop stepper motor because power isn't disrupted to turn the dc motor shaft, as in a stepper motor, which was described above in connection with FIGS. 1 and 2. DC motors are also currently less expensive than stepper motors.

Various solutions have been offered to deal with this positioning problem including the use of stops and the use of a closed-loop dc motor control system. Stops are fixed structures that are placed in the path of a controlled device that prevent further movement of the device in a particular direction. Use of stops may be difficult, however, where more than two control positions are required, as for the service station illustrated in FIGS. 1–3, where at least three positions are required.

Closed-loop dc motor control systems utilize a feedback device, such as an encoder, a switch, or tachometer, to track the actual position of the controlled device. The actual position is fed back and compared with the desired position. Any difference between the two is corrected by sending a further signal to the motor to rotate the shaft until it properly positions the controlled device. This design provides accurate motor control and positioning of controlled devices, as with open-loop stepper motor control systems. A drawback to such closed-loop systems is that these feedback devices are expensive. This added expense may result in the cost of this closed-loop dc motor control system approaching or exceeding that of an open-loop stepper motor control system.

The present invention is directed to achieving accurate motor control and positioning of controlled devices, comparable to that achieved with a stepper motor driven control system, through the use of a dc motor, while at the same time avoiding the use of expensive feedback control devices to correct for initial inaccuracies in dc motor control. The present invention accomplishes this by varying armature resistance of a dc motor as the motor rotates so, at a constant dc voltage, the dc motor current repeatably varies at least two times per complete revolution of the motor or, at a constant dc current, the dc motor voltage repeatably varies at least two times per complete revolution of the motor. This variation in feedback is used to determine the actual position of the shaft of the motor. Any inaccuracies in the position of the shaft, and thus the controlled device, may then be corrected.

FIGS. 6A–6K are partial schematic views of the operation of a direct current (dc) motor 146 constructed in accordance with the present invention. DC motor 146 includes an armature 148 and a pair of brushes 150 and 152 across which a dc voltage is applied. Armature 148 is shown as including a commutator 154 having five slots 156, 158, 160, 162, and 164, and on which four windings 166, 168, 170, and 172 are wound. Although windings 166, 168, 170, and 172 are shown as being positioned adjacent respective slots 156, 158, 160, and 162, it is to be understood that in other embodiments of the present invention, windings may be nonadjacently positioned with respect to the motor slots. The fifth winding adjacent slot 164 has been taken out of the circuit, by, for example, cutting it to create an open circuit or removing it from motor 146 all together. This causes an open circuit at slot 164.

Figure 6A:
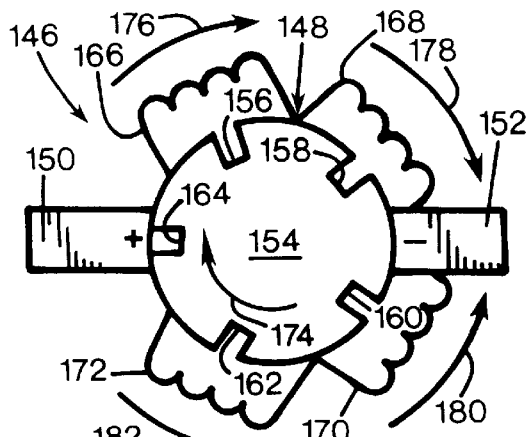
FIGS. 6A–6K are partial schematic views of the operation of a direct current (dc) motor constructed in accordance with the present invention.
Figure 6B:
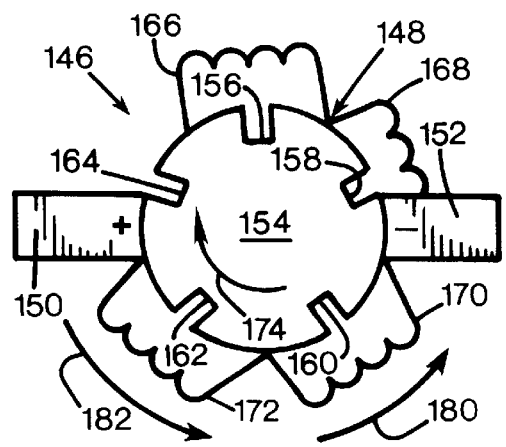
Figure 6C:
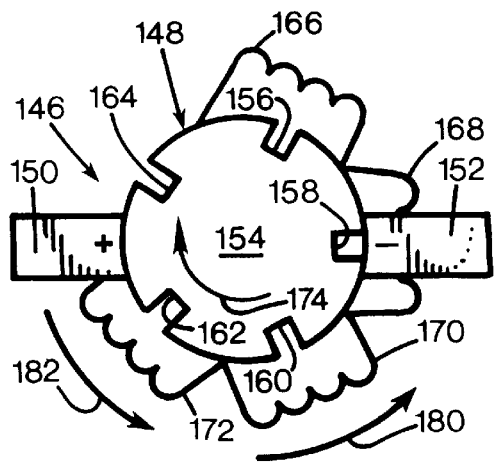
Figure 6D:
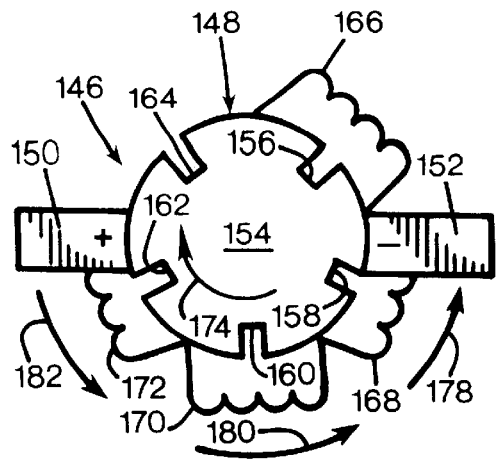
Figure 6E:
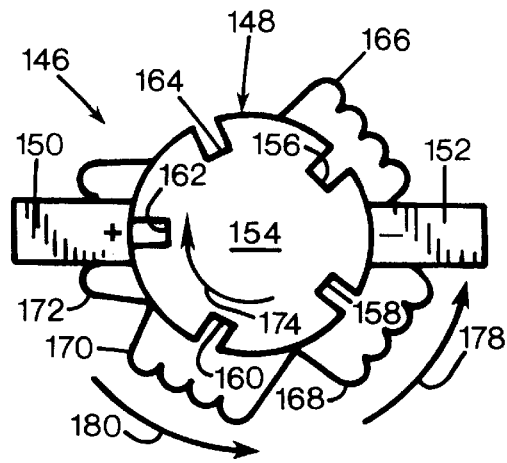
Figure 6F:
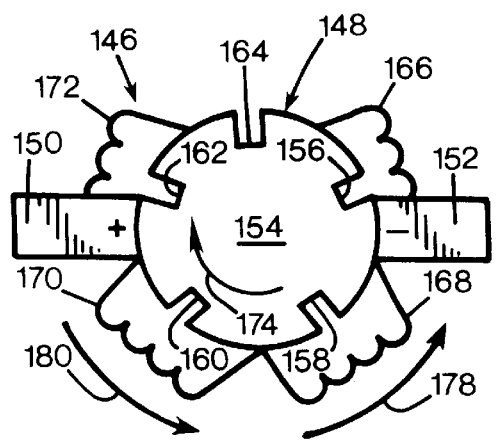

If a fixed dc voltage or constant Root Mean Square (RMS) dc voltage is applied across brushes 150 and 152 as shown in FIGS. 6A–6K, a positive current will flow from brush 150 to brush 152 via some or all of windings 166, 168, 170, and 172, which will cause armature 148 to rotate in a clockwise direction, as generally indicated by arrow 174 in FIGS. 6A–6K. Referring to FIG. 6A, it can be seen that in this position of commutator 154, current will flow through windings 166 and 168, as generally indicated by current arrows 176 and 178, and through windings 170 and 172, as generally indicated by current arrows 180 and 182. These current flows result because slot 164 is under and thereby shorted by brush 150. Referring to FIG. 6B, commutator 154 has rotated clockwise a sufficient amount to the position shown so that current does not flow in windings 166 or 168 because of the open circuit at slot 164. Current does flow, however, in windings 170 and 172, as generally indicated by current arrows 180 and 182. Further rotation of commutator 154 in the clockwise direction is shown in FIG. 6C. At this point, winding 166 has no current flow because of the open circuit at slot 164, also winding 168 is shorted because slot 158 is under brush 152. Current continues to flow through windings 170 and 172 of armature 148 as shown. Referring to FIG. 6D, commutator 154 has rotated clockwise further so that current now flows through windings 168, 170, and 172 of armature 148 as shown, but not through winding 166 because of the open circuit at slot 164. Further clockwise rotation of commutator 154 is shown in FIG. 6E. In this position, winding 172 is short-circuited because slot 162 is located under brush 150. Current still does not flow through winding 166 because of the open-circuit at slot 164. Current flows through windings 168 and 170 of armature 148 as shown. Additional clockwise rotation of armature 148 is shown in FIG. 6F. In this position, no current flows through either winding 166 or 172 because of the open-circuit at slot 164. Current continues to flow through windings 168 and 170 as shown.

Figure 6G:
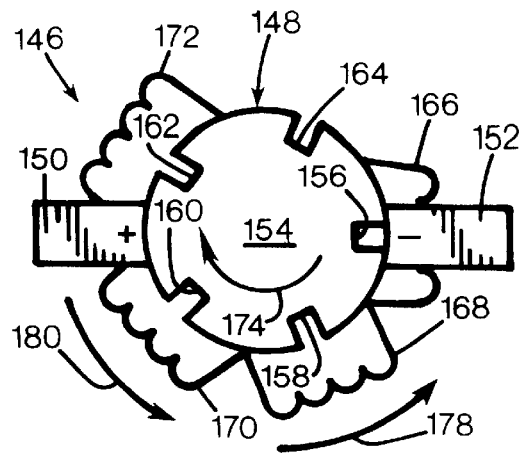

As commutator 154 continues to rotate it reaches the position shown in FIG. 6G. In this position, no current flows through winding 172 because of the open-circuit at slot 164. Winding 166 is shorted because of the position of slot 156 under brush 152. Current continues to flow through windings 168 and 170. Further clockwise rotation of commutator 154 results in the position shown in FIG. 6H. In this position, no current flows through winding 172 because of the open-circuit at slot 164. Current flows through windings 166, 168, and 170 as shown. Additional clockwise rotation of commutator 154 results in the position shown in FIG. 6I. In this position, winding 170 is shorted because slot 160 is under brush 150 and no current flows through winding 172 because of the open-circuit at slot 164. Current continues to flow through windings 166 and 168 as shown. Further clockwise rotation places motor 146 in the position shown in FIG. 6J. In this position, no current flows through windings 170 or 172 because of the open-circuit at slot 164. Current continues to flow through windings 166 and 168 as shown. Still further clockwise rotation of commutator 154 is shown in FIG. 6K. In this position, current flows through all windings as shown because slot 164 is shorted by brush 152.

Figure 6H:
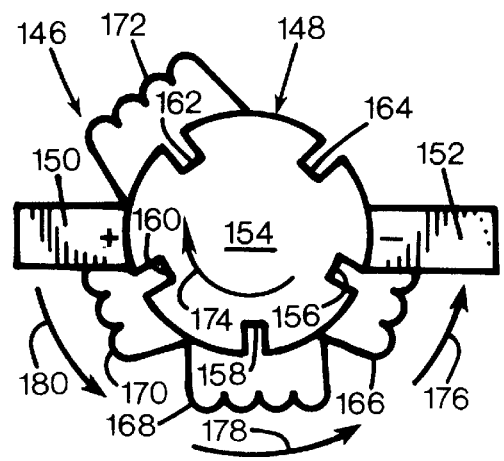
Figure 6I:
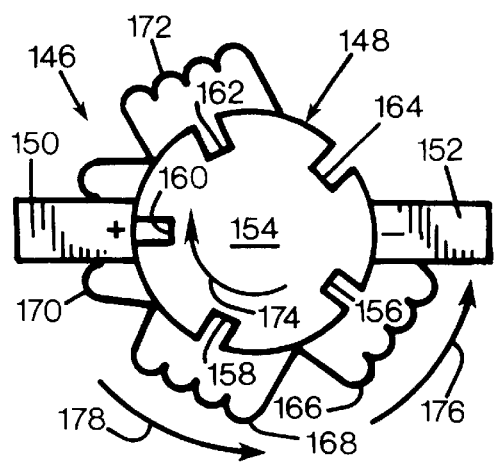
Figure 6J:
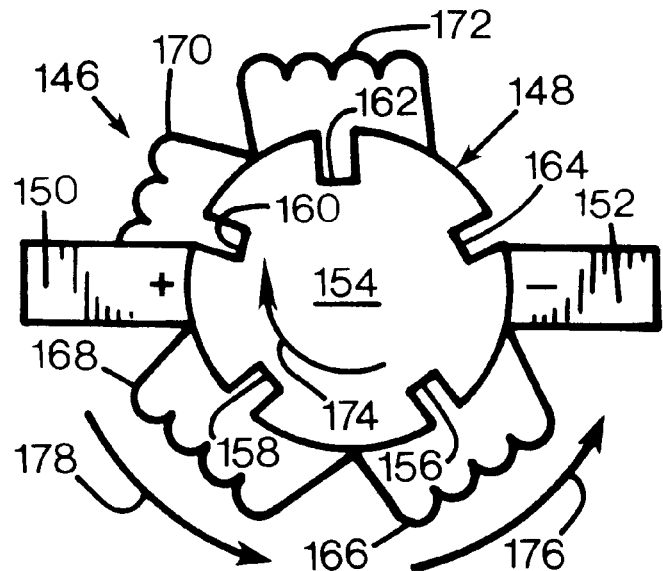
Figure 6K:
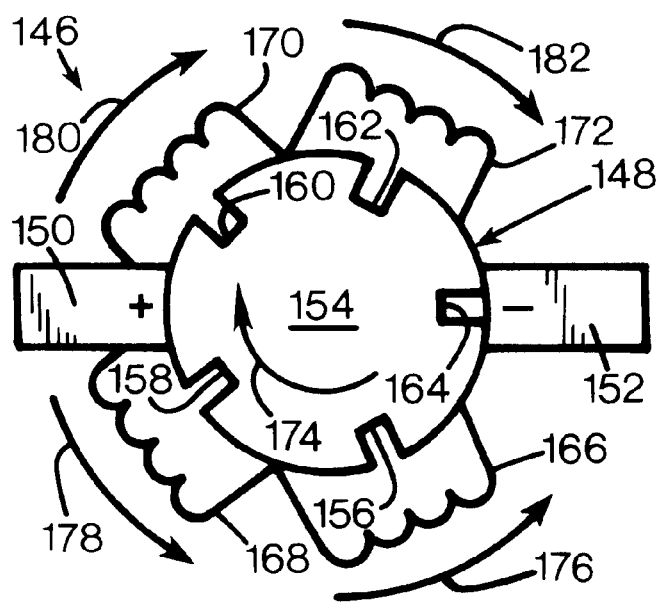

FIG. 7 shows a graph 184 of current versus time for the dc motor operation shown in FIGS. 6A–6K. As can be seen in FIG. 7, the magnitude of the current periodically varies between three values during rotation of commutator 114. The larger magnitude is indicated with a "2-2" in FIG. 7, the intermediate with "0-2", and the smallest magnitude is indicated with a "0-3" in FIG. 7. The "2-2" indicates the value of the total current flowing from brush 150 to brush 152 when current flows through two windings above brushes 150 and 152 and two windings below brushes 150 and 152 in FIGS. 6A and 6K. The "0-2" indicates the value of the total current flowing from brush 150 to brush 152 when current flows through two windings above brushes 150 and 162 or two windings below brushes 150 and 152 as shown in FIGS. 6B, 6C, 6E, 6F, 6G, 6I, and 6J. The "0-3" indicates the value of total current flowing from brush 150 to brush 152 when current flows through three windings above brushes 150 and 152 or three windings below brushes 150 and 152 as shown in FIGS. 6D and 6H. The magnitude of the current is less in the "0-2" case than in the "2-2" case because current is only flowing through half of the motor. The magnitude of the current is less in the "0-3" case than in the "0-2" case because the additional winding adds resistance which decreases current flow for an applied dc voltage. The "6A", "6B", "6C", "6D", "6E", "6F", "6G", "6H", "6I", "6J", and "6K" in FIG. 7 correspond with the positions shown in FIGS. 6A–6K. The dashed portion of graph 184 is representative of additional current flow from brush 150 to brush 152 versus time for the same applied fixed dc voltage or constant Root Mean Square (RMS) dc voltage.

What is apparent from inspection of graph 184 is that a relatively largest current magnitude pulse or "spike" 186 and 188 occurs every half revolution of motor 146. These "spikes" provide a positional indication of the shaft of the dc motor which can be used to more accurately position a controlled device than is possible with a dc motor alone, and which positional accuracy is comparable to that achieved with a separate positional feedback device such as an encoder.

Figure 8:
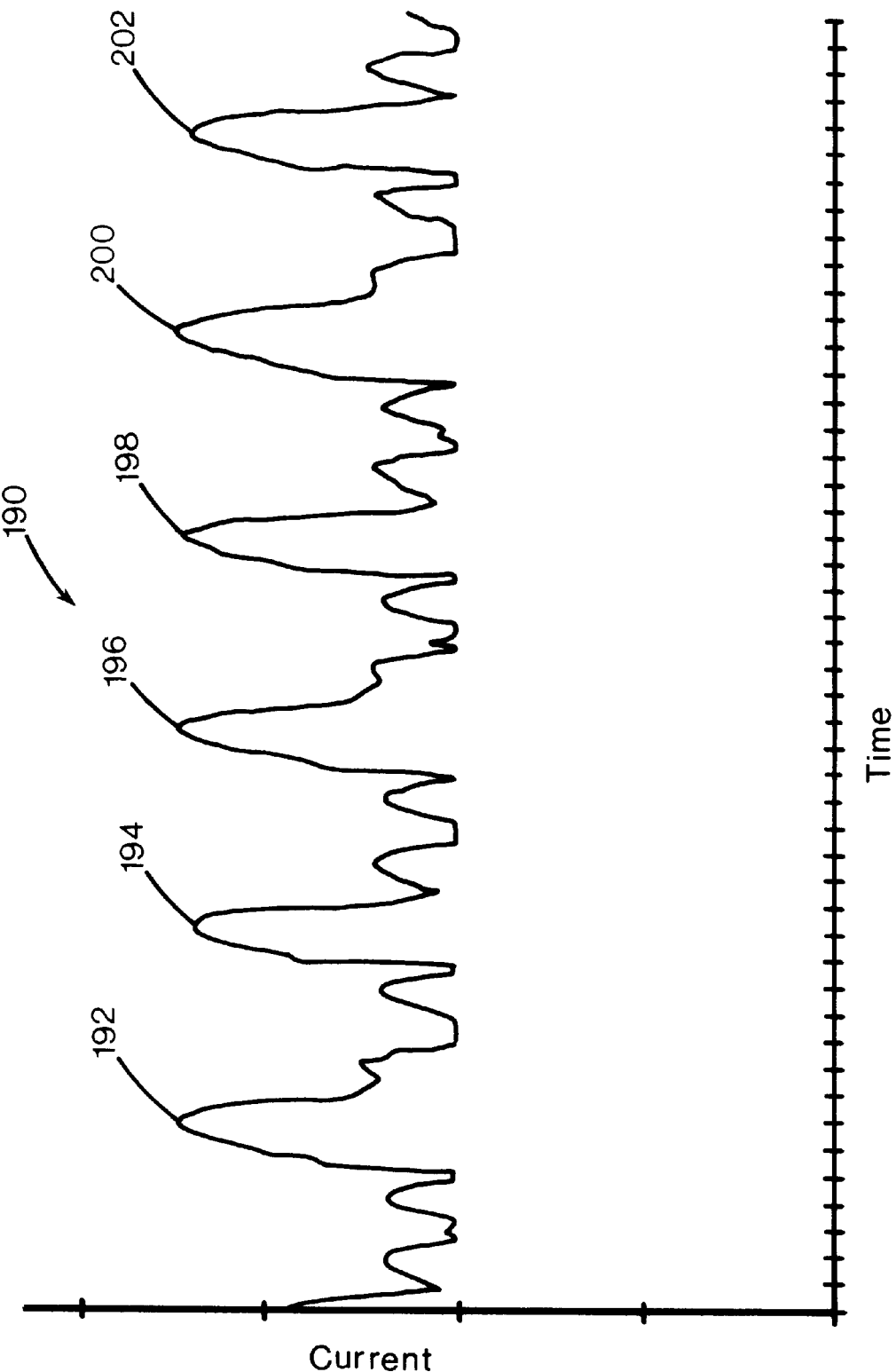
FIG. 8 is a plot of an actual current versus time output for a direct current (dc) motor constructed in accordance with the present invention.

FIG. 8 is a plot 190 of an actual current versus time output for a direct current (dc) motor constructed in accordance with the present invention. Plot 190 was produced with a three-slot dc motor constructed in accordance with the present invention, operating at a constant dc voltage, at 4,000 revolutions per minute (rpm), with no load. As can be seen in FIG. 8, current pulses or "spikes" 192, 194, 196, 198, 200, and 202 occur in a periodic manner and are each indicative of a half revolution of the three-slot dc motor.

Figure 9:
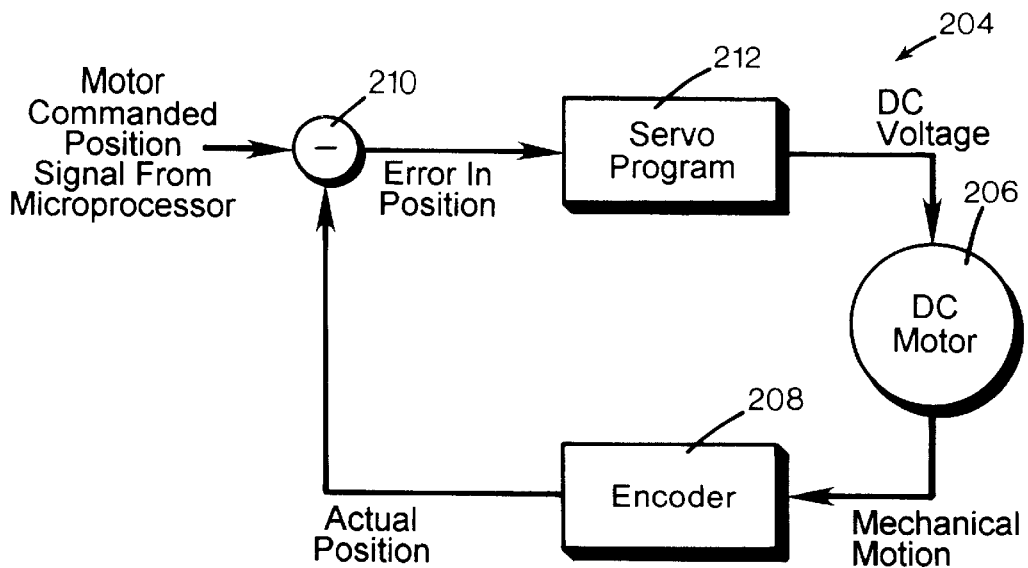
FIG. 9 is a schematic of a closed-loop direct current (dc) motor control system that utilizes a feedback generating device.

A closed-loop direct current (dc) motor control system 204 that utilizes a feedback generating device is shown in FIG. 9. System 204 includes a dc motor 206 used to drive a controlled device (not shown) and a feedback device, in this case an encoder 208, that provides a data signal about the actual position of the device being controlled by the dc motor based on mechanical motion of the device. The actual position data signal is fed back and compared with the motor commanded position signal from a device, such as a microprocessor or controller, that is controlling positioning of the motor, which is schematically represented by a comparator 210 in FIG. 9. Any differences between the two signals is indicative of an error in position which is fed as a control signal to a servo program 212 which converts such control signals into a dc voltage to drive the motor and correct for any such positional error.

Figure 10:
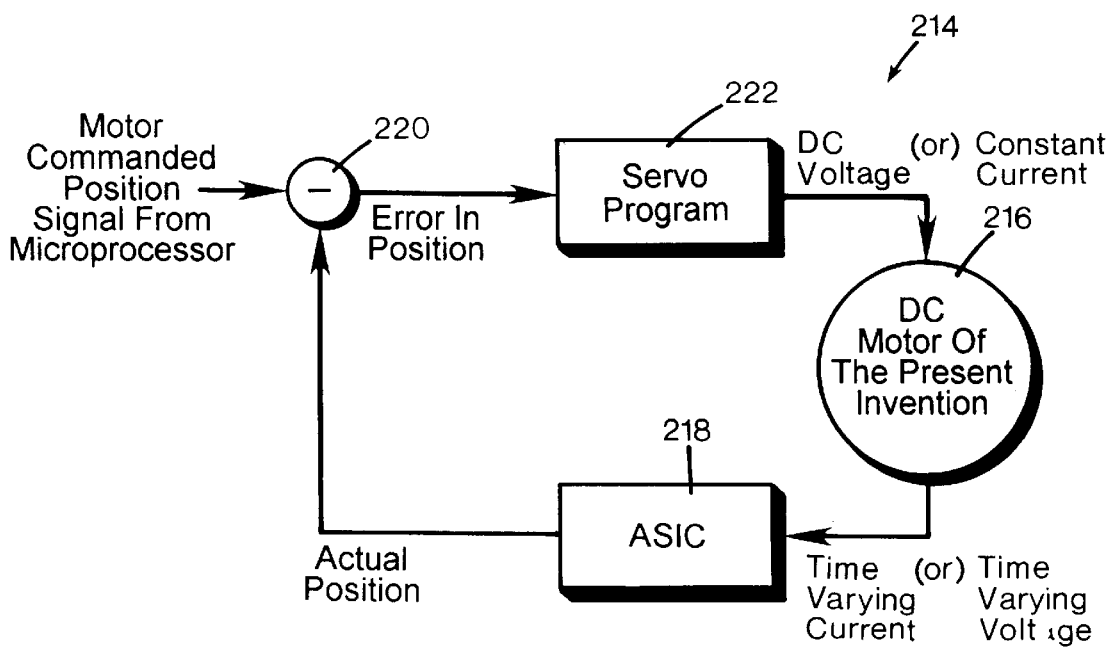
FIG. 10 is a schematic of a closed-loop direct current (dc) motor control system constructed in accordance with the present invention.

FIG. 10 is a schematic of a closed-loop direct current (dc) motor control system 214 in accordance with the present invention. System 214 includes a dc motor 216 constructed in accordance with the present invention, as described above, used to drive a controlled device (not shown). A positional feedback device, like encoder 208 in FIG. 9, that relies on mechanical motion is noticeably absent from system 214. As described above, motor 216 has a motor positional feedback signal (e.g., a time varying current that includes a large amplitude current pulse or "spike" or, alternatively, a time varying voltage that includes a large amplitude voltage pulse or "spike") directly in the motor so that the additional cost of traditional feedback generating devices, such as encoders, switches, and tachometers, are eliminated. This positional signal is processed in a feed back circuit by a relatively lower cost Application Specific Integrated Circuit (ASIC) 218 to create an actual position signal indicative of either the controlled device position or the motor shaft position. This actual position signal is fed back to and compared with the motor commanded position signal from a device, such as a microprocessor or controller, which is controlling positioning of the motor and which is schematically represented by a comparator 220 in FIG. 10. Any differences between the two signals is indicative of an error in position which is fed as a control signal to a servo program 222 which converts such control signals into a dc voltage (for a time-varying current position signal) or a constant current (for a time-varying voltage position signal) to drive the motor and correct for any such positional error.

Figure 11:
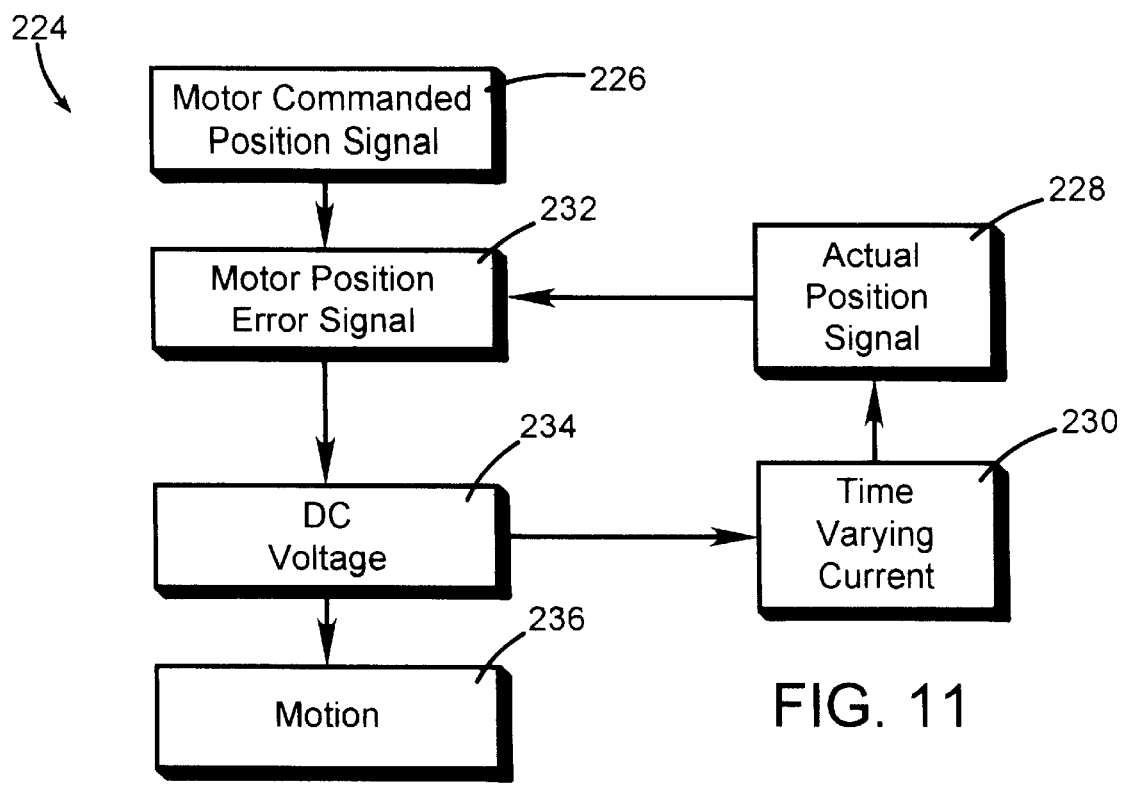
FIG. 11 is a flowchart for controlling a position of a shaft of a direct current motor, having an imbalanced winding, in a closed-loop feedback control system, in accordance with the present invention.

A flowchart 224 for controlling a position of a shaft of a direct current motor in a closed-loop feedback control system in accordance with the present invention is shown in FIG. 11. The direct current motor has an imbalanced winding (i.e., fewer current conducting windings than commutator slots). Flowchart 224 includes the steps of generating a motor commanded position signal for rotating the shaft of the direct current motor to a desired position 226 and generating an actual position signal 228 representative of the actual position of the shaft of the direct current motor. Actual position signal 228 is derived from a time varying magnitude of a current of the direct current motor 230 by, for example, an ASIC, as described above. Flowchart 224 additionally includes the steps of generating a motor position error signal 232 representative of any difference between the motor commanded position signal 226 and the actual position signal 228, and generating a direct current (dc) voltage 234 based on motor position error signal 232 to move or rotate the shaft of the direct current motor to a new actual position which is closer to the desired position 236. The new actual position signal 228 generated from the time varying magnitude of the current of the direct current motor is feedback and compared with motor commanded position signal 226, as described above, to further bring the actual position closer to the desired position. Eventually, through this continued feedback, the actual position will reach the desired position.

Figure 12:
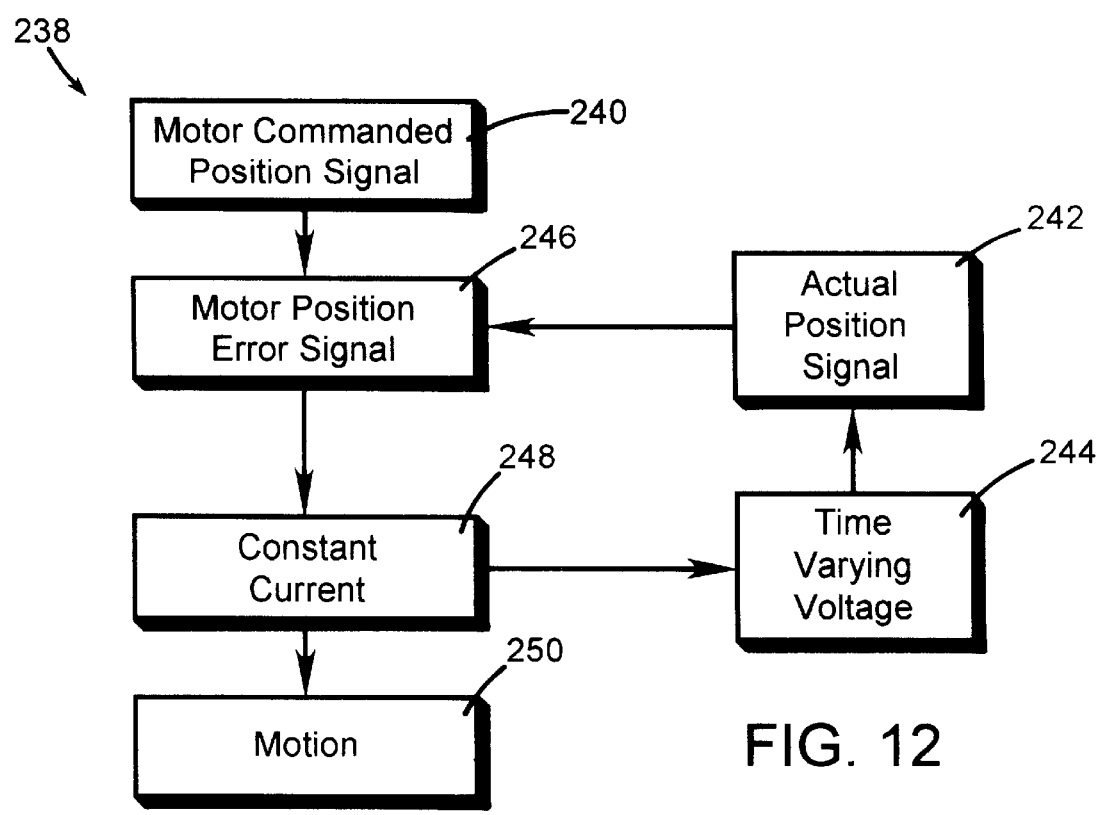
FIG. 12 is a flowchart of an alternative method for controlling a position of a shaft of a direct current motor, having an imbalanced winding, in a closed-loop feedback control system, in accordance with the present invention.

An alternative flowchart 238 for controlling a position of a shaft of a direct current motor in a closed-loop feedback control system in accordance with the present invention is shown in FIG. 12. The direct current motor has an imbalanced winding (i.e., fewer current conducting windings than commutator slots). Flowchart 238 includes the steps of generating a motor commanded position signal for rotating the shaft of the direct current motor to a desired position 240 and generating an actual position signal 242 representative of the actual position of the shaft of the direct current motor. Actual position signal 242 is derived from a time varying magnitude of a voltage of the direct current motor 244 by, for example, an ASIC, as described above. Flowchart 238 additionally includes the steps of generating a motor position error signal 246 representative of any difference between the motor commanded position signal 240 and the actual position signal 242, and generating a constant current 248 based on motor position error signal 246 to move or rotate the shaft of the direct current motor to a new actual position which is closer to the desired position 250. The new actual position signal 242 generated from the time varying magnitude of the voltage of the direct current motor is feedback and compared with motor commanded position signal 240, as described above, to further bring the actual position closer to the desired position. Eventually, through this continued feedback, the actual position will reach the desired position.

FIGS. 13A–13G are partial schematic views of the operation of another embodiment of a direct current (dc) motor 300 constructed in accordance with the present invention. DC motor 300 includes an armature 302 and a pair of brushes 304 and 306 across which a dc voltage is applied. Armature 302 is shown as including a commutator 308 having three slots 310, 312, and 314 on which four windings 316, 318, 320, and 322 are wound. Although windings 316, 318, 320, and 322 are shown as being positioned adjacent slots 310, 312, and 314, it is to be understood that in other embodiments of the present invention, windings may be nonadjacently positioned with respect to the motor slots. As can be seen in FIGS. 13A–13G, windings 318 and 320 are positioned so as to be electrically in parallel. In the embodiment of dc motor 300 shown in FIGS. 13A–13G, windings 318 and 320 have only half as may turns as windings 316 and 322 so that the size of dc motor 300 does not have to be increased to accommodate the parallel windings. Different turns combinations for the parallel windings (e.g., three turns for winding 318 for every one turn for winding 320) are within the scope of the present invention. Also, in other embodiments of a dc motor constructed in accordance with the present invention, windings 318 and 320 may have the same number of turns as windings 316 and 322 by increasing the size of dc motor 300.

Figure 13A:
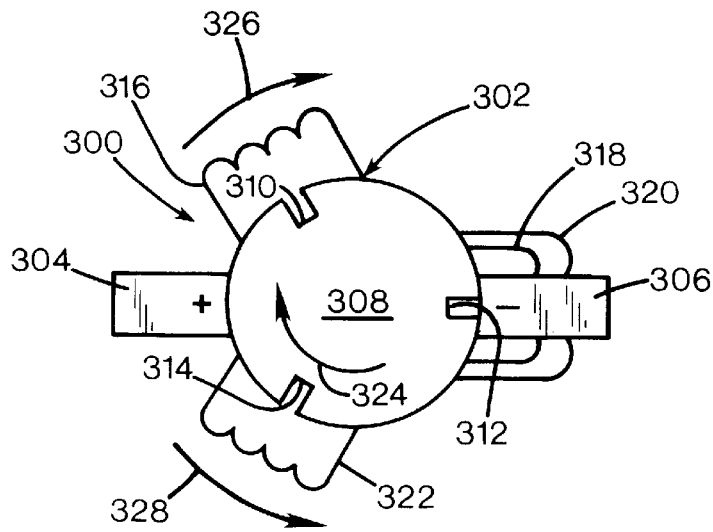
FIGS. 13A–13G are partial schematic views of the operation of another embodiment of a direct current (dc) motor constructed in accordance with the present invention.
Figure 13B:
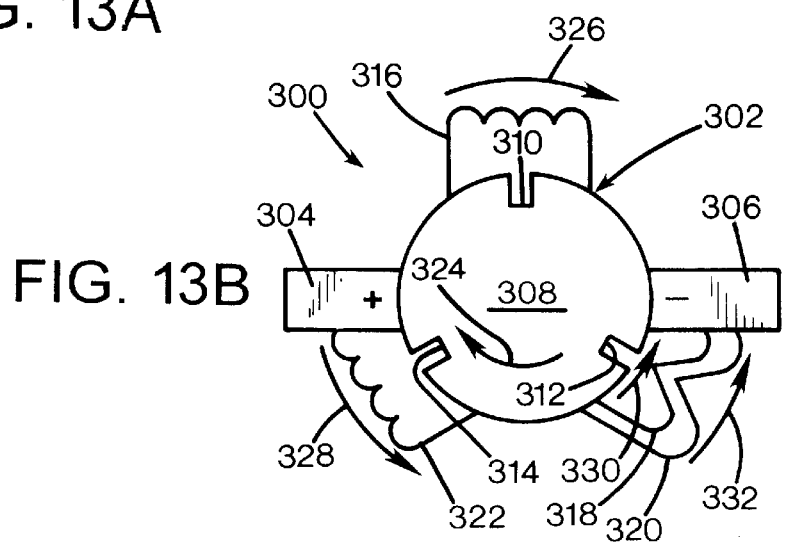
Figure 13C:
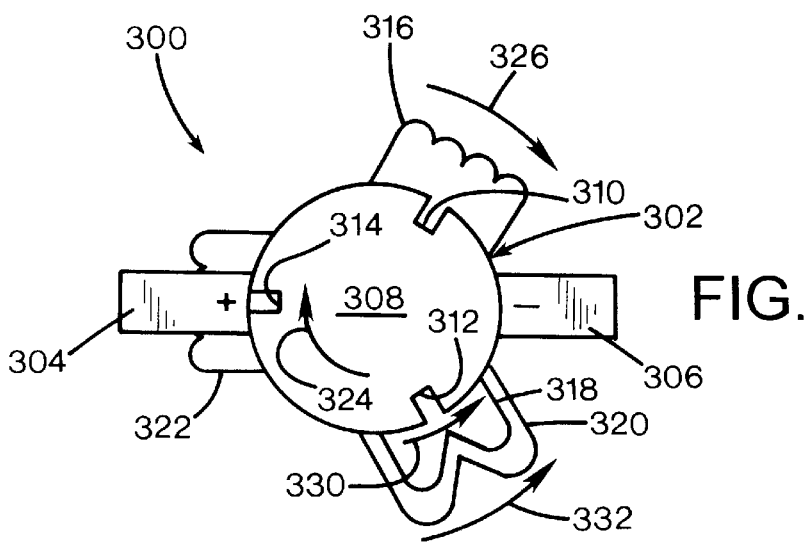

If a fixed dc voltage or constant Root Mean Square (RMS) dc voltage is applied across brushes 304 and 306 as shown in FIGS. 13A–13G, a positive current will flow from brush 304 to brush 306 via two or more of windings 316, 318, 320 and 322, which will cause armature 302 to rotate in a clockwise direction, as generally indicated by arrow 324. Referring to FIG. 13A, it can be seen that in this position of commutator 308, current will flow through windings 316, as generally indicated by current arrow 326, and through winding 322, as generally indicated by current arrow 328. No current flows through windings 318 and 320 because they are shorted by brush 306. Referring to FIG. 13B, commutator 308 has rotated clockwise a sufficient amount to the position shown so that current now flows through windings 318 and 320, as indicated by current arrows 330 and 332, because they are no longer shorted by brush 306. Current continues to flow as well in windings 316 and 322, as indicated by current arrows 326 and 328. Further rotation of commutator 308 in the clockwise direction is shown in FIG. 13C. At this point, winding 322 has no current flow because it is shorted by brush 304. Current continues to flow through winding 316, as indicated by current arrow 326, and windings 318 and 320, as indicated by current arrows 330 and 332.

Figure 13D:
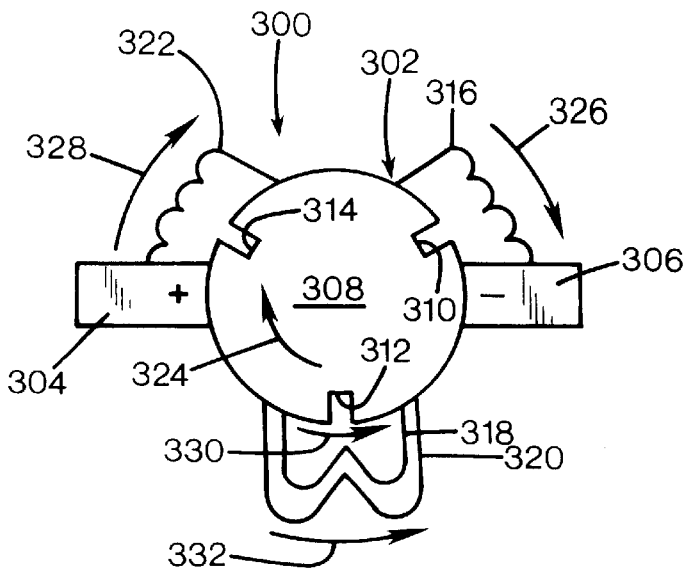
Figure 13E:
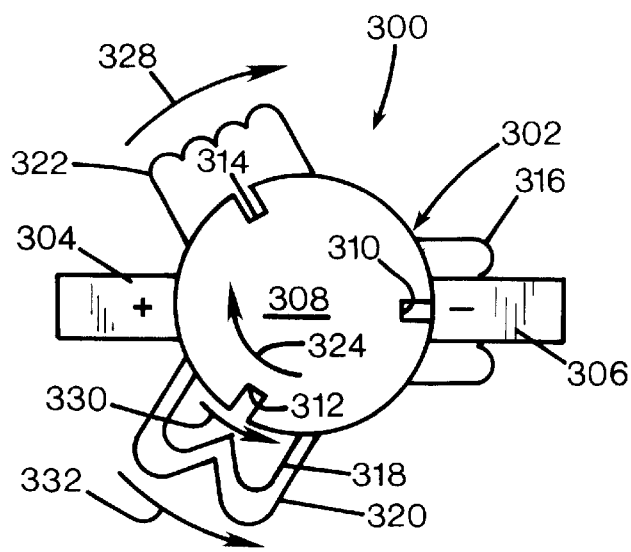
Figure 13F:
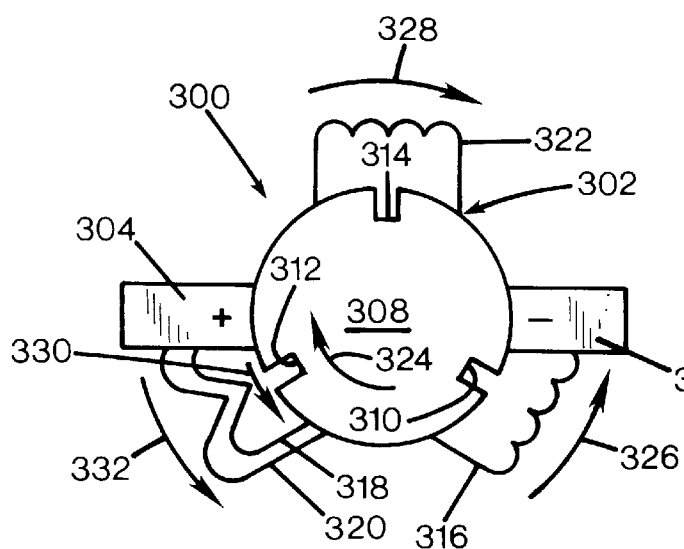

Referring to FIG. 13D, commutator 308 has rotated clockwise further so that current continues to flow through windings 316, 318 and 320, and now again flows through winding 322, as indicated by current arrow 328, because winding 322 is no longer shorted by brush 304. Further clockwise rotation of commutator 308 is shown in FIG. 13E. In this position, winding 316 is shorted by brush 306 and no current flows through it. Current continues to flow through winding 322, as indicated by current arrow 328, as well as through windings 318 and 320, as indicated by current arrows 330 and 332. Additional clockwise rotation of armature 302 is shown in FIG. 13F. In this position, current continues to flow through windings 318, 320, and 322, and now again flows through winding 316, as indicated by current arrow 326, because winding 316 is no longer shorted by brush 306. As commutator 308 continues to rotate it reaches the position shown in FIG. 13O. In this position, no current flows through windings 318 and 320 because they are shorted by brush 304. Current continues to flow through windings 316 and 322, as shown by current arrows 326 and 328.

FIG. 14 shows a graph 334 of current versus time for the dc motor operation shown in FIGS. 13A–13G. As can be seen in FIG. 14, the magnitude of the current periodically varies between four values during rotation of commutator 308. The largest magnitude is indicated with a "1-¼" in FIG. 14, the next largest magnitude is indicated with "2-¼", the next largest magnitude is indicated with a "1-1" in FIG. 14, and the smallest magnitude with a "1-¼". The "1-¼" indicates the value of the total current flowing from brush 304 to brush 306 when current flows through one winding above brushes 304 and 306 and two parallel windings below brushes 304 and 306, as shown in FIGS. 13C and 13E. The "¼" value results because windings 318 and 320 have half the turns, and thus half the resistance of windings 316 and 322, and also because windings 318 and 320 are in parallel. This lower resistance allows more current flow for the same applied voltage, as shown by Ohm's law: Voltage (V)= Resistance (R)×Current (I). For example, if windings 316 and 322 each have a resistance of one (1) ohm ($\Omega$), then the resistance of windings of 318 and 322 would each be one-half (½) ohm ($\Omega$). The total resistance of a parallel combination of two resistors $R_1$ and $R_2$ is:

$$R_T = (R_1 \times R_2)/(R_1 + R_2)$$

For the parallel combination of windings 318 and 320, the total resistance is:

$$R_{T\ 318\ and\ 320} = (½ \times ½)/(½ + ½) = ¼$$

The "2¼" indicates the value of the total current flowing from brush 304 to brush 306 when current flows through two windings 316 and 322 above brushes 304 and 306, and the two parallel windings 318 and 320 below brushes 304 and 306, as shown in FIG. 13D. The magnitude of the current is less in the "2¼" case than in the "1¼" case because the additional winding adds resistance which decreases current flow for an applied dc voltage.

Figure 13G:
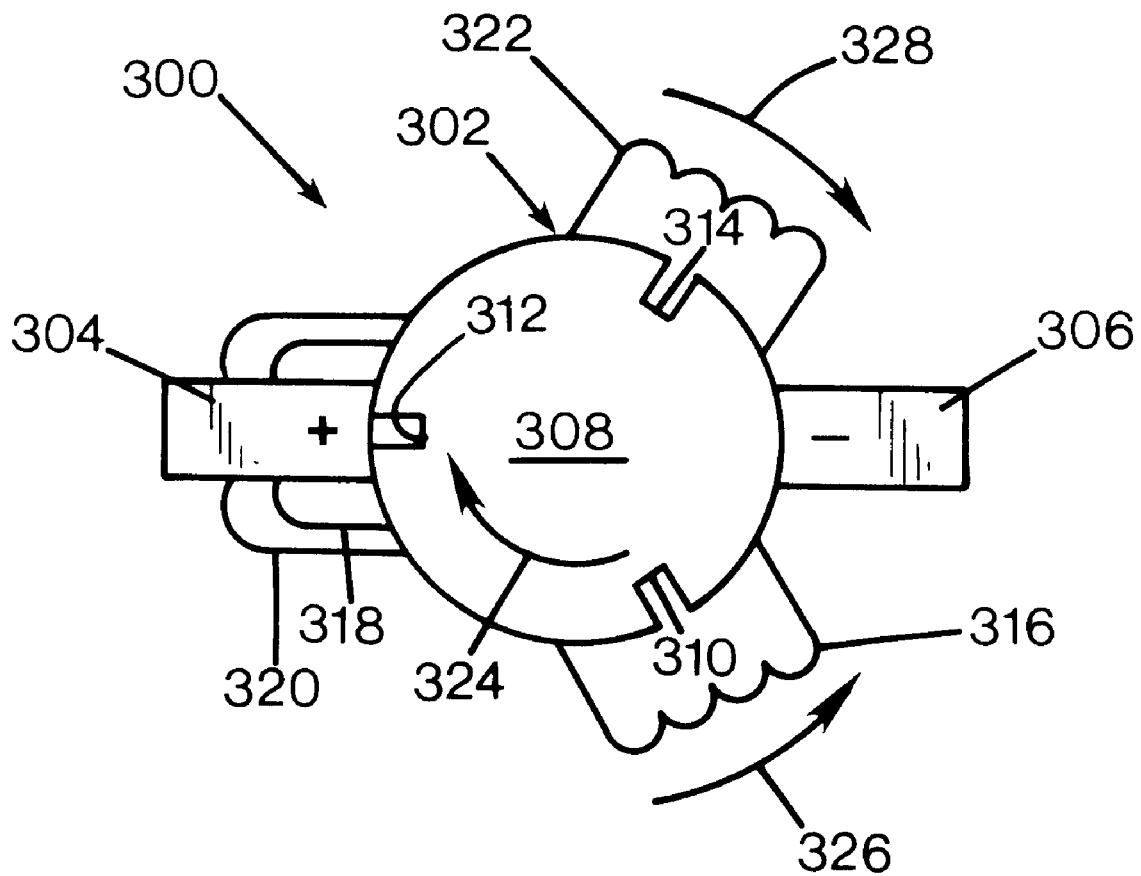

The "1-1" indicates the value of total current flowing from brush 304 to brush 306 when current flows through one winding above brushes 304 and 306, and one winding below brushes 304 and 306, as shown in FIGS. 13A and 13G. The magnitude of the current is less in the "1-1" case than in the "2¼" case because the resistance of parallel windings 318 and 320 is less than that of either winding 316 or 322 alone.

The "1-1¼" indicates the value of total current flowing from brush 304 to brush 306 when current flows through one winding above brushes 304 and 306, and three windings below brushes 304 and 306, two of which are in parallel, as shown in FIGS. 13B and 13F. The magnitude of current is less in the "1-1¼" case than in the "1-1" case because of the additional parallel windings below brushes 304 and 306.

The "13A", "13B", "13C", "13D", "13E", "13F", and "13G" in FIG. 14 correspond with the positions shown in FIGS. 13A–13G. The dashed portion of graph 334 is representative of additional current flow from brush 304 to brush 306 versus time for the same applied fixed dc voltage or constant Root Mean Square (RMS) dc voltage as motor rotates another half turn to finish a complete rotation.

The relatively largest current magnitude pulses or "spikes" 336 and 338 occur every half revolution of motor 300. These "spikes" provide a positional indication of the shaft of dc motor 300 which can be used to more accurately position a controlled device than is possible with a dc motor alone, and which positional accuracy is comparable to that achieved with a separate positional feedback device such as an encoder.

FIG. 15 is a plot 340 of an actual current versus time output for a direct current (dc) motor having two parallel windings like motor 300, discussed above. Plot 340 was produced with a three-slot dc motor constructed in accordance with the present invention, operating at a constant dc voltage of 1.5 Volts, at 777 revolutions per minute (rpm), with no load. As can be seen in FIG. 15, current pulses or "spikes" 342, 344, 346, 348, 350, and 352 occur in a periodic manner, with each pair-being indicative of a half revolution of the three-slot dc motor.

The discussion above with regard to FIGS. 10–12 applies to the alternate embodiment of a dc motor shown in FIGS. 13–15. In applying FIGS. 10–12 to this alternate embodiment, an imbalanced winding refers to the use of a parallel winding to produce a waveform like that shown in FIGS. 14 and 15 which can be used to provide a dc motor positional feedback signal. The positional feedback signal may be either a time varying current that includes relatively large periodic current pulses or "spikes" or a time varying voltage that includes relatively large periodic voltage pulses or "spikes."

Although the invention has been described and illustrated in detail, it is to be clearly understood that the same is intended by way of illustration and example only, and is not to be taken by way of limitation. For example, a dc current source may be used instead of a dc voltage to control a motor in accordance with the present invention. For such embodiments, motors in accordance with the present invention generate a time-varying voltage indicative of motor shaft or controlled device position. This time-varying voltage may be used in a closed-loop feedback system, as described above. As another example, a hybrid closed-loop feedback control system and method in accordance with the present invention may alternate between a dc voltage source and a dc current source to control a motor in accordance with the present invention. Such a system and method would be designed to utilize the time-varying current from the motor for motor control when the dc voltage source was operational and the time-varying voltage from the motor for motor control when the dc current source was operational. As an additional example, the present invention is applicable in dc motor configurations other than the illustrated three and five pole dc motors (e.g., seven, eight, nine, or twelve pole, dc motors). As a further example and as noted above, the present invention may find application in devices other than printing mechanisms. The spirit and scope of the invention are to be limited only by the terms of the following claims.

What is claimed is:

1. A direct current motor for use in a closed-loop control system, comprising:
   a commutator, the commutator including a plurality of slots and being configured to rotate;
   a plurality of windings, the number of windings corresponding to one more than the number of slots of the commutator; and
   a plurality of brushes, the brushes being configured so that application of a direct current voltage across the brushes results in a current flow in at least one of the windings which causes the commutator to rotate.

2. The direct current motor of claim 1, wherein two of the windings are electrically in parallel.

3. The direct current motor of claim 1, wherein the current flowing in the windings varies with time and has a maximum magnitude indicative of a position of the motor.

4. The direct current motor of claim 1, further comprising a shaft coupled to the commutator so that rotation of the commutator results in rotation of the shaft, and wherein the current flowing in the windings varies with time in a manner indicative of a position of the shaft.

5. The direct current motor of claim 4, wherein the current flowing in the windings has a maximum magnitude every one hundred and eighty degrees (180°) of rotation of the shaft.

6. A closed-loop control system, comprising:
   a direct current motor including a shaft, a commutator having a plurality of slots and being configured to rotate, and a plurality of windings, the number of windings corresponding to one more than the number of slots of the commutator, the direct current motor being configured so that application of a direct current voltage to the motor causes the shaft to rotate and produces a current that varies with time as the shaft rotates and that has a maximum magnitude indicative of a position of the shaft of the motor;
   a motor position signal source, the motor position signal source generating a motor commanded position signal for rotating the shaft of the direct current motor to a desired position;
   a feedback circuit configured to generate an actual position signal representative of the actual position of the shaft of the direct current motor, the actual position signal being derived from the time varying magnitude of the current, and further configured to generate a motor position error signal representative of any difference between the motor commanded position signal from the motor position signal source and the actual position signal; and
   a direct current voltage source, the direct current voltage source being coupled to the direct current motor;
   wherein the motor position error signal is coupled to the direct current voltage source to rotate the shaft of the direct current motor based on the motor position error signal to correct for any error in the desired position of the shaft of the direct current motor.

7. The closed-loop control system of claim 6, wherein the motor position signal source includes one of a microprocessor and a controller.

8. The closed-loop control system of claim 6, wherein the feedback circuit includes an Application Specific Integrated Circuit (ASIC) that is designed to generate the actual position signal based on the time varying magnitude of the current.

9. The closed-loop control system of claim 8, wherein the feedback circuit further includes a comparator configured to generate the motor position error signal representative of any difference between the motor commanded position signal from the motor position signal source and the actual position signal.

10. The closed-loop control system of claim 6, in a printing mechanism.

11. The closed-loop control system of claim 6, wherein two of the windings are electrically in parallel.

12. A closed-loop control system, comprising:

a direct current motor including a shaft, a commutator having a plurality of slots and being configured to rotate, and a plurality of windings, the number of windings corresponding to one more than the number of slots of the commutator, the direct current motor being configured so that application of a constant current to the motor causes the shaft to rotate and produces a voltage that varies with time as the shaft rotates and that has a maximum magnitude indicative of a position of the shaft of the motor;

a motor position signal source, the motor position signal source generating a motor commanded position signal for rotating the shaft of the direct current motor to a desired position;

a feedback circuit configured to generate an actual position signal representative of the actual position of the shaft of the direct current motor, the actual position signal being derived from the time varying magnitude of the voltage, and further configured to generate a motor position error signal representative of any difference between the motor commanded position signal from the motor position signal source and the actual position signal; and a constant current source, the constant current source being coupled to the direct current motor;

wherein the motor position error signal is coupled to the constant current source to rotate the shaft of the direct current motor based on the motor position error signal to correct for any error in the desired position of the shaft of the direct current motor.

13. The closed-loop control system of claim 12, wherein the motor position signal source includes one of a microprocessor and a controller.

14. The closed-loop control system of claim 12, wherein the feedback circuit includes an Application Specific Integrated Circuit (ASIC) that is designed to generate the actual position signal based on the time varying magnitude of the voltage.

15. The closed-loop control system of claim 14, wherein the feedback circuit further includes a comparator configured to generate the motor position error signal representative of any difference between the motor commanded position signal from the motor position signal source and the actual position signal.

16. The closed-loop control system of claim 12, in a printing mechanism.

17. The closed-loop control system of claim 12, wherein two of the windings are electrically in parallel.

18. A method of controlling a position of a direct current motor in a closed-loop feedback control system, the direct current motor including a shaft, a commutator having a plurality of slots and being configured to rotate, and a plurality of windings, the number of windings corresponding to one more than the number of slots of the commutator, the method comprising the steps of:

generating a motor commanded position signal for rotating the shaft of the direct current motor to a desired position;

generating an actual position signal representative of the actual position of the shaft of the direct current motor, the actual position signal being derived from a time varying magnitude of a current of the direct current motor;

generating a motor position error signal representative of any difference between the motor commanded position signal and the actual position signal; and generating a direct current voltage based on the motor position error signal to rotate the shaft of the direct current motor to the desired position.

19. A method of controlling a position of a direct current motor in a closed-loop feedback control system, the direct current motor including a shaft, a commutator having a plurality of slots and being configured to rotate, and a plurality of windings, the number of windings corresponding to one more than the number of slots of the commutator, the method comprising the steps of:

generating a motor commanded position signal for rotating the shaft of the direct current motor to a desired position;

generating an actual position signal representative of the actual position of the shaft of the direct current motor, the actual position signal being derived from a time varying magnitude of a voltage of the direct current motor;

generating a motor position error signal representative of any difference between the motor commanded position signal and the actual position signal; and generating a constant current based on the motor position error signal to rotate the shaft of the direct current motor to the desired position.

* * * * *